United States Patent
Knoppert et al.

(10) Patent No.: US 11,662,841 B1
(45) Date of Patent: May 30, 2023

(54) METHOD AND APPARATUS FOR INTERACTING WITH HEAD MOUNTED DISPLAY PERIPHERALS

(71) Applicant: Dell Products, LP, Round Rock, TX (US)

(72) Inventors: Michiel Sebastiaan Emanuel Petrus Knoppert, Amsterdam (NL); Thomas Marcus Hinskens, Utrecht (NL); Loo Shing Tan, Singapore (SG); Gerald Rene Pelissier, Mendham, NJ (US); Martin Douglas Sawtell, Singapore (SG)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 17/732,013

(22) Filed: Apr. 28, 2022

(51) Int. Cl.
| | |
|---|---|
| *G06F 3/03* | (2006.01) |
| *G06F 3/038* | (2013.01) |
| *G06F 3/0338* | (2013.01) |
| *G06V 40/13* | (2022.01) |
| *G06V 40/50* | (2022.01) |
| *G06V 40/12* | (2022.01) |
| *G06F 3/02* | (2006.01) |

(52) U.S. Cl.
CPC ............... *G06F 3/038* (2013.01); *G06F 3/02* (2013.01); *G06F 3/0338* (2013.01); *G06V 40/13* (2022.01); *G06V 40/1365* (2022.01); *G06V 40/50* (2022.01); *G06F 2203/0384* (2013.01)

(58) Field of Classification Search
None
See application file for complete search history.

(56) References Cited

U.S. PATENT DOCUMENTS

| | | | | |
|---|---|---|---|---|
| 2002/0054695 A1* | 5/2002 | Bjorn | ................... | G06F 3/0421 715/863 |
| 2005/0024335 A1* | 2/2005 | Wang | ..................... | G06F 3/042 345/166 |
| 2015/0002397 A1* | 1/2015 | Song | ...................... | G06F 3/038 345/163 |

* cited by examiner

*Primary Examiner* — Joseph R Haley
(74) *Attorney, Agent, or Firm* — Prol Intellectual Property Law, PLLC; H. Kenneth Prol

(57) ABSTRACT

An extended reality (XR) handheld controller to operate with a head-mounted display (HMD) device and information handling system includes the HMD device having an HMD processor, a data storage device, and an HMD display device to present to a user an XR image of an environment and the XR handheld controller may include a handheld controller microcontroller, a handle portion, a multimodal joystick, and a fingerprint reader formed into the multimodal joystick, wherein the multimodal joystick provides directional input when the fingerprint reader detects a user's fingerprint and the user tilts the multimodal joystick in a direction, and wherein the multimodal joystick provides push-button input when the fingerprint reader does not detect the user's fingerprint and the user presses a side of the multimodal joystick.

20 Claims, 8 Drawing Sheets

US 11,662,841 B1

METHOD AND APPARATUS FOR INTERACTING WITH HEAD MOUNTED DISPLAY PERIPHERALS

FIELD OF THE DISCLOSURE

The present disclosure generally relates to user interaction within virtual reality, augmented reality, mixed reality, and other extended reality environments provisioned with display devices of an information handling system by, for example, a head mounted display device. The present disclosure more specifically relates to interacting with a head mounted display using an extended reality handheld controller and head mounted control compute stick.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may be operatively coupled to an extended reality device such as a head mounted display (HMD) device that allows a user to view a simulated extended reality environment.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
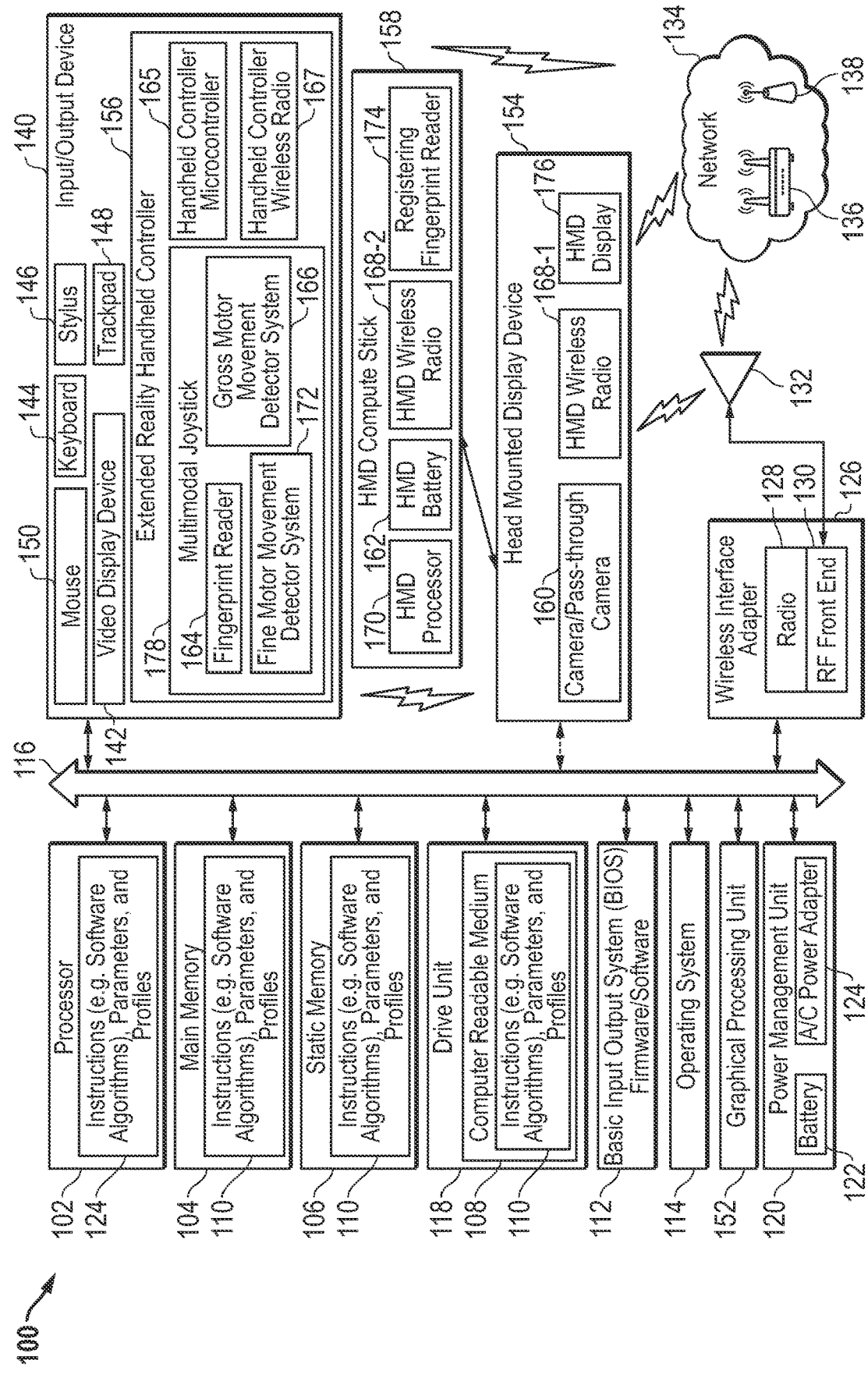
FIG. 1 is a block diagram illustrating an information handling system with a head mounted display (HMD) device according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Head mounted display (HMD) devices may be wearable around the user's head and/or eyes and have the capability of providing displayed or projected images to a user. In an example, a user may be provided with a completely virtual reality (VR) environment while using the HMD device. In another example, the HMD devices may allow the user to see through those displayed or projected images in, for example, augmented reality (AR) or mixed reality (MR). Indeed, HMD devices may be capable of generating any type of extended reality (XR) environment such as AR, VR, MR, or any other type of XR environment provided by the HMD device and contemplated to exist along a reality-virtuality continuum.

HMD devices may be used for a variety of tasks and purposes. For example, HMD devices may be used to engage in video games, videoconferences, distance learning, virtual manufacturing, immersive training and simulation, three-dimensional (3D) visualization and review, guided or remote assist applications, and other tasks or processes that can be done virtually. These tasks and processes may be accomplished, according to the present disclosure, with the use of, among other input/output devices, an extended reality (XR) handheld controller. In an example embodiment, the XR handheld controller may be used to interact with those XR images and XR environments presented to the user via the HMD device.

The present specification describes an XR handheld controller to operate with an HMD device and information handling system. In an embodiment, the HMD device includes an HMD processor, a data storage device, and an HMD display device used to present to a user an extended reality image of an environment. The XR handheld controller used by a user to interact within the XR environment displayed by the HMD device includes a multimodal joystick and a fingerprint reader formed into the multimodal joystick. The multimodal joystick is configured to operate as a direction input device or a push-button input device based on whether the user's fingerprint is detected at the fingerprint reader. In an embodiment, the multimodal joystick provides gross motor directional input when the fingerprint reader detects a user's fingerprint and the user tilts the multimodal joystick in a direction. In another embodiment, the multimodal joystick provides fine motor direction input when the fingerprint reader detects a user's fingerprint and movement of the fingers across the fingerprint reader but the joystick is not tilted or moved. In yet another embodiment, the multimodal joystick provides push-button input when the fingerprint reader does not detect the user's fingerprint and the user presses a side of the multimodal joystick.

In an embodiment, the fingerprint reader may be used to log a user into the HMD device and allow the user to interact with the operations of the HMD device such as interact with the XR environments and applications executed by the HMD device. During the verification process of the user, a processing device such as a processor of an operatively coupled information handling system or a processing resource within the HMD device may access a data storage device that maintains fingerprint data associated with an identification of a user. When the fingerprint is accessed and the identification of the user is determined, the user may be logged into the HMD device. In an embodiment, the HMD device may include an HMD compute stick that has a registering fingerprint reader. This registering fingerprint reader may be used by a user to initially register the user with the HMD device by recording the user's fingerprint and associating that fingerprint with the user's identification. A user may be allowed to input various identification data at the HMD device using the XR handheld controller or other input device. This identification data may include a name, a birthdate, an address, a phone number, or an email address, among other identification data. The user may also be prompted, as a new user, to input a password or passcode and a username associated with the detected fingerprint and identification data. Once the user has provided this information, any subsequent detection of the user's fingerprint at the fingerprint reader on the XR handheld controller will automatically log the user into the HMD device. A logged in user may also have various, personalized, automatic settings for the HMD device or the XR handheld controller to be implemented upon logging that user into the HMD device in some embodiments.

The multimodal joystick on the XR handheld controller may also be used by the user to provide input as described herein. Again, the multimodal joystick may be used as a directional input device or a push-button input based on whether the user's fingerprint is detected at the fingerprint reader of the XR handheld controller. Still further, the multimodal joystick and fingerprint reader of the XR handheld controller may detect gross motor movement and fine motor movement. In an embodiment, gross motor movement detector system may be executed to detect whether gross motor movement directional input has occurred when the user tilts the multimodal joystick with the user's fingerprint stationary on the fingerprint reader. In an embodiment, a fine motor movement detector system may be executed to detect whether fine motor movement directional input has occurred when the user moves the user's fingerprint across the fingerprint reader, but the multimodal joystick is not tilted or moved.

FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a convertible laptop, a tablet, a smartphone, a desktop computer, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video, or data communication. For example, an information handling system 100 may be any mobile or other computing device capable of executing a set of instructions (sequential or otherwise) that specify actions to be taken by that machine. In an embodiment, the information handling system 100 may be operatively coupled to a server or other network device as well as with an HMD device 154 and provide data storage resources, processing resources, and/or communication resources to the HMD device 154 as described herein. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include memory (volatile (e.g., random-access memory, etc.), non-volatile (read-only memory, flash memory etc.) or any combination thereof), one or more processing resources, such as a central processing unit (CPU), a graphics processing unit (GPU), processing, hardware, controller, or any combination thereof. Additional components of the information handling system 100 can include one or more storage devices, one or more communications ports for communicating with external devices, as well as, various input and output (I/O) devices 140, such as a keyboard 144, a mouse 150, a video display device 142, a stylus 146, a trackpad 148, and a XR handheld controller 156, or any combination thereof. The information handling system 100 can also include one or more buses 116 operable to transmit data communications between the various hardware components described herein. Portions of an information handling system 100 may themselves be considered information handling systems and some or all of which may be wireless.

Information handling system 100 can include devices or modules that embody one or more of the devices or execute instructions for the one or more systems and modules described above, and operates to perform one or more of the methods described above. The information handling system 100 may execute code instructions 110 via processing resources that may operate on servers or systems, remote data centers, or on-box in individual client information handling systems according to various embodiments herein. In some embodiments, it is understood any or all portions of code instructions 110 may operate on a plurality of information handling systems 100.

The information handling system 100 may include processing resources such as a processor 102 such as a central processing unit (CPU), accelerated processing unit (APU), a neural processing unit (NPU), a vision processing unit (VPU), an embedded controller (EC), a digital signal processor (DSP), a GPU 152, a microcontroller, or any other type of processing device that executes code instructions to perform the processes described herein. Any of the processing resources may operate to execute code that is either firmware or software code. Moreover, the information handling system 100 can include memory such as main memory 104, static memory 106, computer readable medium 108 storing instructions 110 of, in an example embodiment, a gross motor movement detector system 166 or a fine motor movement detector system 172, and drive unit 118 (volatile (e.g., random-access memory, etc.), nonvolatile (read-only memory, flash memory etc.) or any combination thereof).

As shown, the information handling system 100 may further include a video display device 142. The video display device 142, in an embodiment, may function as a liquid crystal display (LCD), an organic light emitting diode (OLED), a flat panel display, or a solid-state display. Although FIG. 1 shows a single video display device 142, the present specification contemplates that multiple video display devices 142 may be used with the information handling system to facilitate an extended desktop scenario, for example. Additionally, the information handling system 100 may include one or more input/output devices 140 including an alpha numeric input device such as a keyboard 144 and/or a cursor control device, such as a mouse 150, touchpad/trackpad 148, a stylus 146, a XR handheld controller 156, or a gesture or touch screen input device associated with the video display device 142. In an embodiment, the video display device 142 may provide output to a user that includes, for example, one or more windows describing one or more instances of applications being executed by the processor 102 of the information handling system. In this example embodiment, a window may be presented to the user that provides a GUI representing the execution of a word processing application, a GUI representing the execution of a spreadsheet application, a GUI representing the execution of a computer-aided design application, a GUI representing the execution of a gaming application, a GUI representing the execution of an email application, and a GUI representing the execution of a web browsing application, an image generation application such as presentation software, or a drawing program, among others. In an embodiment, each of these windows may be represented on the HMD display 176 of the HMD device 154 when the HMD device 154 is being used by the user. In an embodiment, the information handling system 100 may be local to the user who may operate the HMD device 154. The information handling system 100 and/or HMD device 154 are operatively coupled to a network 134 via a wireless interface adapter 126 or a wireless interface adapter within the HMD device 154, respectively. In an embodiment, the HMD device 154 and XR handheld controller 156 may be operatively coupled to one another and, optionally, to the information handling system 100 either via a wired or wireless connection such as Bluetooth or other protocol as described herein.

The network interface device of the information handling system 100 shown as wireless interface adapter 126 can provide connectivity among devices such as with Bluetooth or to a network 134, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an access point 136 or base station 138 used to operatively couple the information handling system 100 and/or the HMD device 154 to a network 134. In a specific embodiment, the network 134 may include macro-cellular connections via one or more base stations 138 or a wireless access point 136 (e.g., Wi-Fi or WiGig), or such as through licensed or unlicensed WWAN small cell base stations 138. Connectivity may be via wired or wireless connection. For example, wireless network access points 136 or base stations 138 may be operatively connected to the information handling system 100 and, in an embodiment, the HMD device 154. Wireless interface adapter 126 may include one or more radio frequency (RF) subsystems (e.g., radio 128) with transmitter/receiver circuitry, modem circuitry, one or more antenna front end circuits 130, one or more wireless controller circuits, amplifiers, antennas 132 and other circuitry of the radio 128 such as one or more antenna ports used for wireless communications via multiple radio access technologies (RATs). The radio 128 may communicate with one or more wireless technology protocols. In and embodiment, the radio 128 may contain individual subscriber identity module (SIM) profiles for each technology service provider and their available protocols for any operating subscriber-based radio access technologies such as cellular LTE communications.

In an example embodiment, the wireless interface adapter 126, radio 128, and antenna 132, HMD wireless radio 168, or HMD compute stick wireless radio 168-2 may provide connectivity to one or more of the peripheral devices that may include a wireless video display device 142, a wireless keyboard 144, a wireless mouse 150, a wireless headset such as the HMD device 154, a microphone 176, an audio headset, a wireless stylus 146, and a wireless trackpad 148, among other wireless peripheral devices used as input/output (I/O) devices 140 including any XR handheld controller 156 associated with the HMD device 154. In an embodiment, the HMD device 154 may include a wireless radio and an antenna to wirelessly couple the HMD device 154 or HMD compute stick 158 to the information handling system 100 via the antenna 132 and radio 128. In an embodiment, the HMD device 154 or HMD compute stick 158 may operate with Bluetooth radio protocols. In other embodiments, the HMD device 154 or HMD compute stick 158 may operate with Wi-Fi 802.11 radio protocol, 5G NR radio protocols, or other wireless protocols. In an embodiment, an antenna controller operatively coupled to an operating system (OS) 114 may concurrently transceive data to and from various wireless devices such as the HMD device 154 or HMD compute stick 158 or network 134 while a processing device of the HMD device 154, the XR handheld controller 156, or HMD compute stick 158 executes gross motor movement detector system 166 and fine motor movement detector system 172 in order to execute computer readable program code to detect gross and fine movements at the multimodal joystick 178 being used in operation with the HMD device 154. In an embodiment, the processing device that executes the gross motor movement detector system 166 and fine motor movement detector system 172 along with other processes associated with the operation of the HMD device 154 may be a processing device on the information handling system 100, at the HMD device 154, at the HMD compute stick 158, at the XR handheld controller 156, or a combination of processors on these devices. In one embodiment, the HMD device 154 may be operatively coupled to the information handling system 100 via a wired connection to the bus 116, via, for example, a port in the information handling system 100.

The XR handheld controller 156 may be a peripheral input/output device 140 used by the user to interact with virtual images presented to the user via the HMD device 154. In an embodiment, the XR handheld controller 156 may be operatively coupled to the information handling system 100 via a wireless connection using the wireless interface adapter 126 operatively coupled to the bus 116. In this embodiment, input signals from the XR handheld controller 156 may be relayed to the processor 102, the HMD processor 170, or other processing device and used as input to manipulate an XR image presented to the user at the HMD device 154. In an embodiment, the XR handheld controller 156 may be operatively coupled to the bus 116 via a wired connection and receive this input as described. In another embodiment, the XR handheld controller 156 may be operatively coupled to the HMD device 154 via a wireless connection via operation of the HMD wireless radio 168-1 or 168-2 (on HMD compute stick 158) communicating with a wireless module and handheld controller wireless radio 167 at the XR handheld controller 156 or with the radio 128 of the information handling system 100. In an example embodiment, the XR handheld controller 156 may provide input to a processing device at the HMD device 154 to manipulate an XR image presented to the user at the HMD device 154. In another example embodiment, the XR handheld controller 156, being operatively coupled to the bus 116, wireless interface adapter 126, or to HMD device wireless radio 168-1 or 168-2, may provide input to the processor 102 of the information handling system 100 to manipulate an XR image presented to the user at the HMD device 154. In one example embodiment, the GPU 152 of the information handling system 100 may be used to process and generate the graphics used to create the XR environment at the HMD device 154.

As described, the wireless interface adapter 126 may include any number of antennas 132 which may include any number of tunable antennas for use with the system and methods disclosed herein. Although FIG. 1 shows a single antenna 132, the present specification contemplates that the number of antennas 132 may include more or less of the number of individual antennas shown in FIG. 1. Additional antenna system modification circuitry (not shown) may also be included with the wireless interface adapter 126 to implement coexistence control measures via an antenna controller in various embodiments of the present disclosure.

In some aspects of the present disclosure, the wireless interface adapter 126 may operate two or more wireless links. In an embodiment, the wireless interface adapter 126 may operate a Bluetooth wireless link using a Bluetooth wireless protocol. In an embodiment, the Bluetooth wireless protocol may operate at frequencies between 2.402 to 2.48 GHz. Other Bluetooth operating frequencies are also contemplated in the presented description. In an embodiment, a Bluetooth wireless link may be used to wirelessly couple the input/output devices operatively and wirelessly to the information handling system 100. This wireless coupling may include the HMD device 154, the XR handheld controller 156, mouse 150, keyboard 144, stylus 146, trackpad 148, and/or video display device 142 to a wireless interface adapter 126 in order for these devices to operate wirelessly with the information handling system 100 in some embodiments.

In a further aspect, the wireless interface adapter 126 may operate the two or more wireless links with a single, shared communication frequency band such as with the 5G standard relating to unlicensed wireless spectrum for small cell 5G operation or for unlicensed Wi-Fi WLAN operation to the network 134 in an example aspect. For example, a 2.4 GHz/2.5 GHz or 5 GHz wireless communication frequency bands may be apportioned under the 5G standards for communication on either small cell WWAN wireless link operation or Wi-Fi WLAN operation. In some embodiments, the shared, wireless communication band may be transmitted through one or a plurality of antennas 132 may be capable of operating at a variety of frequency bands. In a specific embodiment described herein, the shared, wireless communication band may be transmitted through a plurality of antennas used to operate in an N×N MIMO array configuration where multiple antennas 132 are used to exploit multipath propagation which may be any variable N. For example, N may equal 2, 3, or 4 to be 2×2, 3×3, or 4×4 MIMO operation in some embodiments. Other communication frequency bands, channels, and transception arrangements are contemplated for use with the embodiments of the present disclosure as well and the present specification contemplates the use of a variety of communication frequency bands.

As described herein, the HMD device 154 also includes an antenna system (e.g., HMD wireless radio 168-1) or HMD computer stick 158 (e.g., HMD wireless radio 168-2) used to transceive data to and from the information handling system 100 using these wireless communication protocols described herein. Additionally, or alternatively, the HMD wireless radio 168-1 within the HMD device 154 or HMD compute stick wireless radio 168-2 in the XR handheld controller 156 may be used to communicate wirelessly with a remote server at the network 134 via an access point 136 or base station 138.

The wireless interface adapter 126 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth standards, or similar wireless standards may be used. Wireless interface adapter 126 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 134 may be based on the radio access network (RAN) standards that implement, for example, eNodeB or gNodeB hardware connected to mobile phone networks (e.g., cellular networks) used to communicate with the information handling system 100. In the example embodiment, the information handling system 100 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, a WWAN RF front end (e.g., antenna front end 130 circuits) of the information handling system 100 may operate on a licensed WWAN wireless radio with authorization for subscriber access to a wireless service provider on a carrier licensed frequency band.

In other aspects, the information handling system 100 operating as a mobile information handling system may operate a plurality of wireless interface adapters 126 for concurrent radio operation in one or more wireless communication bands. The plurality of wireless interface adapters 126 may further share a wireless communication band or operate in nearby wireless communication bands in some embodiments. Further, harmonics and other effects may impact wireless link operation when a plurality of wireless links are operating concurrently as in some of the presently described embodiments.

The wireless interface adapter 126 can represent an add-in card, wireless network interface module that is integrated with a main board of the information handling system 100 or integrated with another wireless network interface capability, or any combination thereof. In an embodiment the wireless interface adapter 126 or an HMD wireless radio 168-1 or HMD compute stick 158 HMD wireless radio 168-2 may include one or more radio frequency subsystems including transmitters and wireless controllers for connecting via a multitude of wireless links. In an example embodiment, an information handling system 100 may have an antenna system transmitter for Bluetooth, 5G small cell WWAN, or Wi-Fi WLAN connectivity and one or more additional antenna system transmitters for macro-cellular communication. The RF subsystems and radios 128 and for the HMD wireless radio 168 include wireless controllers to manage authentication, connectivity, communications, power levels for transmission, buffering, error correction, baseband processing, and other functions of the wireless interface adapter 126 and for the HMD wireless radio 168.

In an embodiment, the HMD device 154 may include its own XR software platform and applications. For example, the HMD device 154 may include a game engine such as Unity® developed by Unity Technologies or Unreal® developed by Epic Games that may be used to help design the XR software used to operate the HMD device 154. The HMD device 154 may also include standards such as Open XR® developed by Khronos Group that allows developers to build applications that may work across a variety of HMD devices 154. Development kits such as Vuforia®, Nvidia Omniverse® developed by Nvidia GTC, ARCore® developed by Google, Qualcomm XR® developed by Qualcomm, may also be executed by the HMD device 120 in order to provide for the development of AR applications and mark less tracking algorithms and computer code to be executed by the head-mounted display device 120. These kits and standards, among others, may be used to develop executable program code and provide content to the user at the HMD device 154. In an embodiment, the information handling system 100 may include one or more application programming interfaces (APIs) that allow the information handling system 100 to cause certain applications to be executed on the HMD device 154. These APIs may be associated with one or more sets of instructions (e.g., software algorithms), parameters, and profiles 110 that, during execution of an XR environment at the HMD device 154, causes these applications to be represented to the user within the XR environment. For example, a word processing application being executed by the processor 102 of the information handling system 100 may include an API that, when the HMD device 154 is being used by the user, allows that application to be executed at the HMD device 154 with the user being allowed to interact with the word processing application and maintain updates to changes made in the XR environment. It is appreciated that other types of applications may also be associated with APIs that allow those applications to be reproduced in an XR environment at the HMD device 154.

In an embodiment, the HMD device 154 may include its own wireless interface adapter, radio, antenna front end, and antenna such as the HMD wireless radio 168-1. Additionally, or alternatively, the HMD compute stick 156 may include an HMD wireless radio 168-2. This may allow the HMD device 154 and/or HMD computer stick 156 to communicate with the information handling system 100 or, alternatively, directly to a network maintaining a remote server used to provide the XR environment to the user (e.g., software as a service, storage as a service, processing as a service). As such, this wireless interface adapter, radio, antenna front end, and antenna of the HMD wireless radio 168 may conserve processing resources of the HMD processor 170 and/or processor 102/GPU 152 of the HMD device 154 and information handling system 100 if necessary. With the wireless interface adapter, radio, antenna front end, and antenna of the HMD wireless radio 168 of the HMD device 154 (and/or the HMD wireless radio 168-2 of the HMD compute stick 156), the HMD device 154 may communicate with the information handling system 100 or the network 134 via an out-of-band (OOB) communication channel, for example. The OOB communication may initially facilitate the communication of the HMD device 154 (and/or the HMD wireless radio 168-2 of the HMD compute stick 156) with the information handling system 100 or some external sensors via, for example, Bluetooth or Wi-Fi communication protocols. In an embodiment, the OOB communication may also be accomplished using those wireless communication protocols described in connection with the operation of the wireless interface adapter 126. In an embodiment, this OOB communication may occur below the basic input/output system (BIOS) 112 or OS 114 allowing the communication to proceed in the background of other processes being executed by the processor 102 or other processing device such as the GPU 152. This allows the processing resources of the processor 102 or GPU 152 of the information handling system 100 or the processing devices of the HMD device 154 to be conserved for other processing tasks associated with the processing of XR images and data associated with the display of those images to the user via the display device of the HMD device 154.

During operation, the information handling system 100 may communicate with the HMD device 154 or HMD compute stick 156 either via a wired connection or wirelessly as described herein. The operation of the HMD device 154 may not be dependent on the information handling system 100 being in operation, in an embodiment, and the HMD device 154 may be used by the user whether the information handling system 100 is operatively coupled to the HMD device 154 or HMD compute stick 156 or not, in some embodiments.

In an embodiment, the HMD device 154 may include the necessary hardware used to display an XR image of a surrounding physical environment while tracking the location of the HMD device 154 (and the user) within the physical environment. This hardware used may vary depending on the type of process used to display the XR image to the user. Example processes may be grouped into two general categories: inside-out positional tracking processes and outside-in tracking processes. Although, the present specification contemplates the use of outside-in tracking processes, for convenience in description, the present specification describes an HMD device 154 the operates using an inside-out process of tracking the HMD device 154. With the inside-out process of tracking the HMD device 154, the HMD device 154 includes a camera/pass-through camera 160 and other sensors used to determine the location of the HMD device 154 as it moves within an environment, in an embodiment. In an embodiment, the HMD device 154 may include positional sensors such as a global positioning system (GPS) unit, an inertial measurement unit (IMU), an e-Compass unit, and/or other positional measurement tools such as an accelerometer, a capacitive transducer, a hall effect sensor, a laser doppler vibrometer, a multi-axis displacement transducer, a potentiometer, or a confocal chromatic sensor. Other positional sensors are also contemplated, including a capacitive displacement sensor, an eddy-current sensor, an ultrasonic sensor, a grating sensor, an inductive non-contact position sensor, a linear variable differential transformer, a photodiode array, a piezo-electric transducer, a proximity sensor, a rotary encoder, a seismic displacement pick-up, and a string potentiometer, along with any other positional sensors developed in the future. The positional sensors (e.g., GPS unit, IMU, and/or eCompass unit) in an embodiment may operate to measure location coordinates (x, y, z) of the HMD device 154, as well as orientation (θ), velocity, and/or acceleration. Velocity, acceleration, and trajectory of the HMD device 154 in such an embodiment may be determined by comparing a plurality of measured location coordinates and orientations taken over a known period of time, or may be measured directly by onboard positional sensor such as an accelerometer. Additionally, or alternatively, Wi-Fi triangulation or other wireless multilateration may be used that uses the characteristics of nearby Wi-Fi hotspots and other wireless access points 136 or base station nodes 138 to discover where within an environment the HMD device 154 is located. Additionally, or alternatively, an Internet-of-Things (IoT) device may be used that include sensors that may be detectable by the HMD device 154 and provides data to the HMD device 154 that it is within a physical environment.

In an embodiment, a simultaneous localization and mapping (SLAM) engine executing a SLAM process (described herein), the IoT devices, and the Wi-Fi hotspot triangulation process may all be used as data inputs to the head mounted display CPU/GPU, the processor 102 of the information handling system 100, or other operatively coupled processing resource to better determine the initial configuration and location of the HMD device 154. In an embodiment, the OOB communication channel may help to communication wirelessly with some of these sensors when determining the location of the HMD device 154. Again, in an embodiment, the HMD device 154 may include an embedded controller that operates this OOB communication link so that this communication may be conducted below the operating system of the HMD device 154. This prevents the HMD processor 170 (e.g., a processor, GPU, CPU, or other microcontroller, etc.) from having to receive and compute this data leaving the HMD processor 170 to conduct, for example, the SLAM computations described herein.

The HMD device 154 may also be capable of capturing video or still images of its surrounding environment, which may include one or more identifiable landmarks. For example, the HMD device 154 may include one or more cameras such as the camera/pass-through camera 160. These cameras may capture two-dimensional images of the surrounding environment, which may be combined with distance measurements gathered by a plurality of, for example, IR emitters and detectors to generate a three-dimensional image of the surrounding environment. The cameras, in an embodiment, may be, for example, a stereo triangulation camera, an Infrared (IR) camera, a sheet of light triangulation camera, a structured light camera, a time-of-flight or time of arrival camera, an interferometry camera, a coded aperture camera, a RGB digital camera, an infrared digital camera, a telephoto lens digital camera, a fish-eye digital camera, a wide-angle digital camera, a close-focus digital camera, or any other type of camera. The three-dimensional image generated by a processing device (e.g., the HMD processor 170, GPU 152, or processor 102 and the like) in an embodiment may be used to determine the position and orientation of the HMD device 154 with respect to the one or more landmarks with respect to the physical surroundings as well as any virtual images in a projected XR setting on the HMD device 154.

In an embodiment, a processing device either on the HMD device 154 (e.g., HMD processor 170) itself or the processor 102 in operative communication with the HMD device 154 may process this received data from these sensors and the camera in order to facilitate the presentation of an XR image of a surrounding environment to a user via a display device on the HMD device 154 as described herein. This may be done using, for example the SLAM process. The SLAM process, in an embodiment, may be employed in order to identify the position of the headset with respect to its surrounding environment, model the surrounding environment as viewed from the perspective of the headset wearer, and render the modeled image in a three-dimensional environment matching the surrounding real-world environment. The surrounding environment may be virtual or some combination of physical and virtual for XR. It does this by a processing device (e.g., processor 102 or the HMD processor 170 of the period HMD device 154) executing computer readable program code describing an algorithm that concurrently maps a surrounding XR environment the HMD device 154 is within and detects the position of the HMD device 154 within that surrounding XR environment. IR emitters and sensors housed within or mounted on the exterior surfaces of the HMD device 154 may measure such distances in an embodiment. IR emitters and sensors may be mounted in all directions around the exterior surface of the HMD device 154, in some embodiments. In other embodiments, only portions of the exterior surfaces of the wearable headsets may have infrared emitters and sensors or cameras. For example, the HMD device 154 may emit IR light in a pattern toward the physical landmark, the HMD device 154 may emit IR light, and/or the HMD device 154 may emit IR light toward the physical landmark. The cameras mounted to the HMD device 154 may then capture an image of each of the IR lights reflecting off the surfaces of the physical landmark. If the surrounding environment further includes other ambient light sources, the cameras will also detect illumination from the physical landmark reflecting such ambient light. For example, if desk lamp and/or floor lamp are turned on, the physical landmark in an embodiment may reflect ambient light generated by the lamps.

The depth of surfaces of nearby objects may be determined by analyzing the way in which the pattern of emitted IR light is distorted as it reaches surfaces of varying distances from the headset. For example, the HMD device 154 may determine the depth of the physical landmark by analyzing the way in which the pattern of emitted IR light is distorted as it reaches the surfaces of physical landmark. Similarly, the HMD device 154 may determine the depth of the physical landmark by analyzing the way in which the pattern of emitted IR light is distorted as it reaches the surfaces of physical landmark, and the HMD device 154 may determine the depth of the physical landmark by analyzing the way in which the pattern of emitted IR light is distorted as it reaches the surfaces of physical landmark. With this data and the other data from the other sensors described herein, the processing device may execute the algorithm defining the SLAM process in order to render to a user via the display device of the HMD device 154 an XR image based on a rendered image from the model generated and referenced movement within the surrounding XR environment based on movement of the HMD device 154 relative to physical landmarks.

During operation of the information handling system 100, the user may want to interact with the applications currently being executed on the HMD display 176 by the HMD device 154. The user may implement a XR handheld controller 156. The XR handheld controller 156 may be an input/output device that interfaces with the HMD device 154 and allows a user to interact within an XR environment by, for example, interacting with XR images, such as AR or MR images overlayed on real-world images provided to the HMD device 154 by the camera/pass-through camera 160, applications executed by the information handling system 100 and reproduced at the HMD device 154 via execution of one or more APIs, among other data presented to the user at the HMD device 154. In an embodiment, the XR handheld controller 156 may include one or more location beacons such as an IR emitter (e.g., IR light emitting diode) or visible light emitter may be used to provide a location of the XR handheld controller 156 relative to the HMD device 154 (e.g., relative to a camera/pass-through camera 160 of the HMD device 154). In this embodiment, the location of the XR handheld controller 156 relative to the HMD device 154 may be displayed to the user via the HMD display 176.

The XR handheld controller 156 may further include a handheld controller microcontroller 165 or other processing device, a handheld controller wireless radio 167, one or more buttons, switches, triggers, and the like to allow the user to interact within the XR environment as described herein. In an embodiment, the XR handheld controller 156 may utilize the handheld controller microcontroller 165 or other processing device to execute some or all code instructions of a gross motor directional input detection system to detect multimodal joystick movements or tilt via tilt sensors, may execute some or all of a fine motor directional movement detector system via a fingerprint sensor 164, or may execute some or all of a user log in system with the fingerprint detector 164. In another embodiment, the XR handheld controller 156 may be wirelessly coupled to the HMD device 154 or information handling system 100 via a handheld controller wireless radio 167. The handheld controller wireless radio 167 allows data pertaining to movement of multimodal joystick 178, fingerprint image detection of fingerprint reader 164, or button push detection to be transmitted to the information handling system 100 or HMD device 154 in various embodiments. In an embodiment, the XR handheld controller 156 includes the multimodal joystick 178 which may be moved in plural directions with tilt sensors to detect the movement of the multimodal joystick 178. The multimodal joystick 178 may include, in an embodiment, a concave surface onto which the user may place a thumb or other finger. For ease of understanding, the multimodal joystick 178 will be described as being operated with a user's thumb. The multimodal joystick 178 may be actuated to move about a center pivot. This allows the multimodal joystick 178 to be tilted an amount along any direction within 360 degrees around the multimodal joystick 178. By way of example, a user may be interacting with a gaming application being executed at the HMD device 154 that allows a user to move about within the gaming XR environment. The multimodal joystick 178 when tilted in a left direction causes the user or an avatar representing the user within the XR environment to look or move to the left. Similarly, as the multimodal joystick 178 is tilted in any direction, the user or the avatar representing the user may look or be moved in that direction of tilt.

In an embodiment, the directional tilting of the multimodal joystick 178 described herein may be defined as gross motor movement. To detect this gross motor movement, a processing resource (e.g., the HMD processor 170) of the HMD device 154, the handheld controller microcontroller 165, or some combination in various embodiments may execute code instructions of a gross motor movement detector system 166 that detects the tilting of the multimodal joystick 178 in a direction and register that tilt as a gross motor movement. This gross motor movement may be replicated in the XR environment by causing, for example, the user or an avatar of the user to look or move within the XR environment in a rapid motion. In the example where a user is engaged in a gaming application at the HMD device 154, the gross motor movement detected by the execution of the gross motor movement detector system 166 may move at a relatively quick speed. In an example embodiment, the more the user tilts the multimodal joystick 178, the quicker the user or avatar representing the user looks or moves within the XR environment. In an embodiment, the user may be presented with or be able to access settings that allow the user to adjust the gross movement when tilting the multimodal joystick 178. These settings may be presented to a user via a graphical user interface (GUI) with the HMD device 154 or at a video display device 142 of the information handling system 100.

The multimodal joystick 178, in an embodiment, further includes a fingerprint reader 164. In an embodiment, the fingerprint reader 164 may be placed at a center of the concave portion of the multimodal joystick 178. At this location, the fingerprint of the user or a portion of the fingerprint of the user may be detected by the fingerprint reader 164. The fingerprint reader 164 may implement any device (e.g., fingerprint scanner) used to detect the user's fingerprint including a digital camera and a digital processor to create a biometric template of the user's fingerprint.

In an embodiment, the scan of the user's fingerprint via the fingerprint reader 164 may also be initiated to identify the user. As described herein, the fingerprint scan of the user by the fingerprint reader 164 on the multimodal joystick 178 may allow the user to be identified and logged into the HMD device 154 so that the user may interact with the HMD device 154 and the XR environment presented to the user. Upon detection of a fingerprint by the fingerprint reader 164, in an embodiment, may cause the HMD processor 170 or other processing device (e.g., processor 102 of the information handling system) to access a data storage device that maintains one or more fingerprints or biometric templates of one or more fingerprints. This database of fingerprints in the data storage device may include one or more fingerprints along with identification data associated with each of those fingerprints. When the fingerprint is accessed and the identification of the user is determined, the user may be logged into the HMD device if the user has been biometrically identified.

The fingerprint reader 164 may also be used to detect fine motor movement across the surface of the multimodal joystick 178 in another embodiment. As described herein, the fingerprint reader 164 may detect and capture an image of the user's fingerprint. Additionally, the fingerprint reader 164 may detect travel of the user's thumb across the fingerprint reader 164 by detecting changes, in real-time, in the images of the user's fingerprint. The HMD processor 170 of the HMD device 154 the handheld controller microcontroller 165, or some combination in various embodiments may execute code instructions of the fine motor movement detector system 172, in an embodiment, to detect these changes in the fingerprint detected as the user moves the user's thumb across the fingerprint reader 164, for example, when the multimodal joystick 178 is not tilted or moved as with the gross motor directional input. As the HMD processor 170 detects this fine motor movement, the user or an avatar of the user presented within the XR environment may look or move in fine movements. In the example embodiment where the gaming application is a first-person shooter gaming application being executed at the HMD device 154, the user may use the fine motor movement to, for example, finely move the user's gun so as to be accurately on target.

The fingerprint reader 164 may also be used to determine the mode of input at the multimodal joystick 178. As described herein, the multimodal joystick 178 may be used by the user to provide directional input by tilting the multimodal joystick 178 in one among a plurality of directions. This directional input is determined to be directional input when the fingerprint reader 164 detects the user's fingerprint on the multimodal joystick 178. However, the mode of operation of the multimodal joystick 178 changes when the fingerprint reader 164 does not detect the user's fingerprint (e.g., the user has removed the user's thumb from the surface of the multimodal joystick 178 and fingerprint reader 164). The handheld controller microcontroller 165, or another processor such as HMD processor 170 in various embodiments may detect and execute code instructions for the mode change and interpret the input via the multimodal joystick 178 as push-button input when conditions are right and no fingerprint is detected in embodiments herein. In an embodiment, when the fingerprint reader 164 does not detect the user's fingerprint but does detect that the multimodal joystick 178 has been tilted, the input may change to a push-button input. For example, where the user's fingerprint is not being detected by the fingerprint reader 164 and the multimodal joystick 178 has been tilted to the left, this input may represent a push button of, for example, an "A" button. In this embodiment, the multimodal joystick 178 not only acts as a directional input device but also acts as a push-button input device depending on the detection, or not, of the user's fingerprint at the fingerprint reader 164. In another example embodiment, where the user's fingerprint is not detected at the fingerprint reader 164 and the multimodal joystick 178 is tilted to the right, this input may represent a push button of, for example, a "B" button. With this second mode (e.g., a push-button input) of input being possible at the multimodal joystick 178 the multimodal joystick 178 may reduce the number of individual input buttons, triggers, and joysticks formed into the XR handheld controller 156. This may reduce the complexity of the XR handheld controller 156 to the user, reduce space necessary for the user to interact with all the input methods, and reduce the number of parts that may fail during use. Still further, with the multimodal joystick 178, the user may have a single location where input can be provided to interact within the XR environment reducing the finger movement necessary to do so. Additionally, the use of the multimodal joystick 178 with its fingerprint reader 164 allows a user to differentiate between fine motor movements and gross motor movements within the XR environment.

In an embodiment, the inward movement, such as a central button press, of the multimodal joystick 178 with the detection of the user's fingerprint on the fingerprint reader 164 provides a separate type of input. In an embodiment, the multimodal joystick 178 may be pressed down and into the housing of the XR handheld controller 156. This actuation of the multimodal joystick 178 may be different from other push-button actuations of the multimodal joystick 178 because the user's fingerprint is detected at the fingerprint reader 164 and the actuation is not along a perimeter of the multimodal joystick 178 and instead is directly down on the multimodal joystick 178. This center push-button input may serve as an additional input method.

In an embodiment, the HMD device 154 may include an HMD compute stick 158. The HMD compute stick 158 may be used to remove some of the hardware typically located within a housing of the HMD device 154 to an offsite location. This helps reduce the weight of the HMD device 154 resulting in a relatively more comfortable experience for the user. The HMD compute stick 158 may be operatively coupled to the HMD device 154 via a wired connection and may include, in an example embodiment, a separate body-mounting device to secure the HMD compute stick 158 to another portion of the user's body such as an arm. In an embodiment, the HMD compute stick 158 may include any type of hardware typically associated with the HMD device 154 such as the HMD processor 170, the HMD wireless radio 168-2, the data storage device, a power source such as an HMD battery 162 among other hardware.

In an embodiment, the HMD compute stick 158 may further include a registering fingerprint reader 174. The registering fingerprint reader 174 may be used to initially register a user's fingerprint in the data storage device. As described herein, the user's detected fingerprint detected by the fingerprint reader 164 on the multimodal joystick 178 may be used to log the user into the HMD device 154 and allow the user to operate the HMD device 154. However, in order to initially register the user's fingerprint, the user may place the user's thumb on the registering fingerprint reader 174 in order to initially store the digital image of the user's fingerprint or biometric template of the user's fingerprint in the data storage device and associate the user's identification with that fingerprint. This identification data may include a name, a birthdate, an address, a phone number, or an email address, among other identification data. The user may also be prompted, as a new user, to input a password or passcode and a username associated with the detected fingerprint and identification data. Once the user has provided this information, any subsequent detection of the user's fingerprint at the fingerprint reader 164 on the multimodal joystick 178 of the XR handheld controller 156 will automatically log the user into the HMD device 154. A user's setting for the HMD device 154 or HMD compute stick 156 may be initiated upon login with a fingerprint ID as well in some embodiments. For example, settings may include sensitivity settings or resistance levels required before moving the multimodal joystick 174 or what functions are attributed to the central button push or a detected button push of an "A" button or a "B" button according to one or more modes of embodiments herein.

The information handling system 100 can include one or more set of instructions 110 that can be executed to cause the computer system to perform any one or more of the methods or computer-based functions disclosed herein. For example, instructions 110 may execute a gross motor movement detector system 166, a fine motor movement detector system 172, various software applications, software agents, or other aspects or components. Various software modules comprising application instructions 110 may be coordinated by an operating system (OS) 114, and/or via an application programming interface (API). An example OS 114 may include Windows®, Android®, and other OS types known in the art. Example APIs may include Win 32, Core Java API, or Android APIs.

The disk drive unit 118 and may include a computer-readable medium 108 in which one or more sets of instructions 110 such as software can be embedded to be executed by the processor 102 or other processing devices such as a GPU 152 to perform the processes described herein. Similarly, main memory 104 and static memory 106 may also contain a computer-readable medium for storage of one or more sets of instructions, parameters, or profiles 110 described herein. The disk drive unit 118 or static memory 106 also contain space for data storage. Further, the instructions 110 may embody one or more of the methods as described herein. In a particular embodiment, the instructions, parameters, and profiles 110 may reside completely, or at least partially, within the main memory 104, the static memory 106, and/or within the disk drive 116 during execution by the processor 102 or GPU 152 of information handling system 100. The main memory 104, GPU 152, and the processor 102 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The gross motor movement detector system 166 and fine motor movement detector system 172 may be stored in static memory 106 or on the drive unit 118 that may include access to a computer-readable medium 108 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In an embodiment, the information handling system 100 may further include a power management unit (PMU) 120 (a.k.a. a power supply unit (PSU)). The PMU 120 may manage the power provided to the components of the information handling system 100 such as the processor 102, a cooling system, one or more drive units 118, the GPU 152, a video/graphic display device 142 or other input/output devices 140 such as the stylus 146, a mouse 150, a keyboard 144, and a trackpad 148 and other components that may require power when a power button has been actuated by a user. In an embodiment, the PMU 120 may monitor power levels and be electrically coupled, either wired or wirelessly, to the information handling system 100 to provide this power and coupled to bus 116 to provide or receive data or instructions. The PMU 120 may regulate power from a power source such as a battery 122 or A/C power adapter 124. In an embodiment, the battery 122 may be charged via the A/C power adapter 124 and provide power to the components of the information handling system 100 via a wired connections as applicable, or when A/C power from the A/C power adapter 124 is removed. A PMU and battery 163 or power adapter may also be deployed on the HMD device 154 or HMD compute stick 156 to provide power to these systems. In an embodiment, a PMU and battery 162 or power adapter may also be included within the XR handheld controller 156 to provide power to those hardware devices within the XR handheld controller 156 such as a handheld controller microcontroller 165 or other processing device, the handheld controller wireless radio 167 and the fingerprint reader 164 among other hardware.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
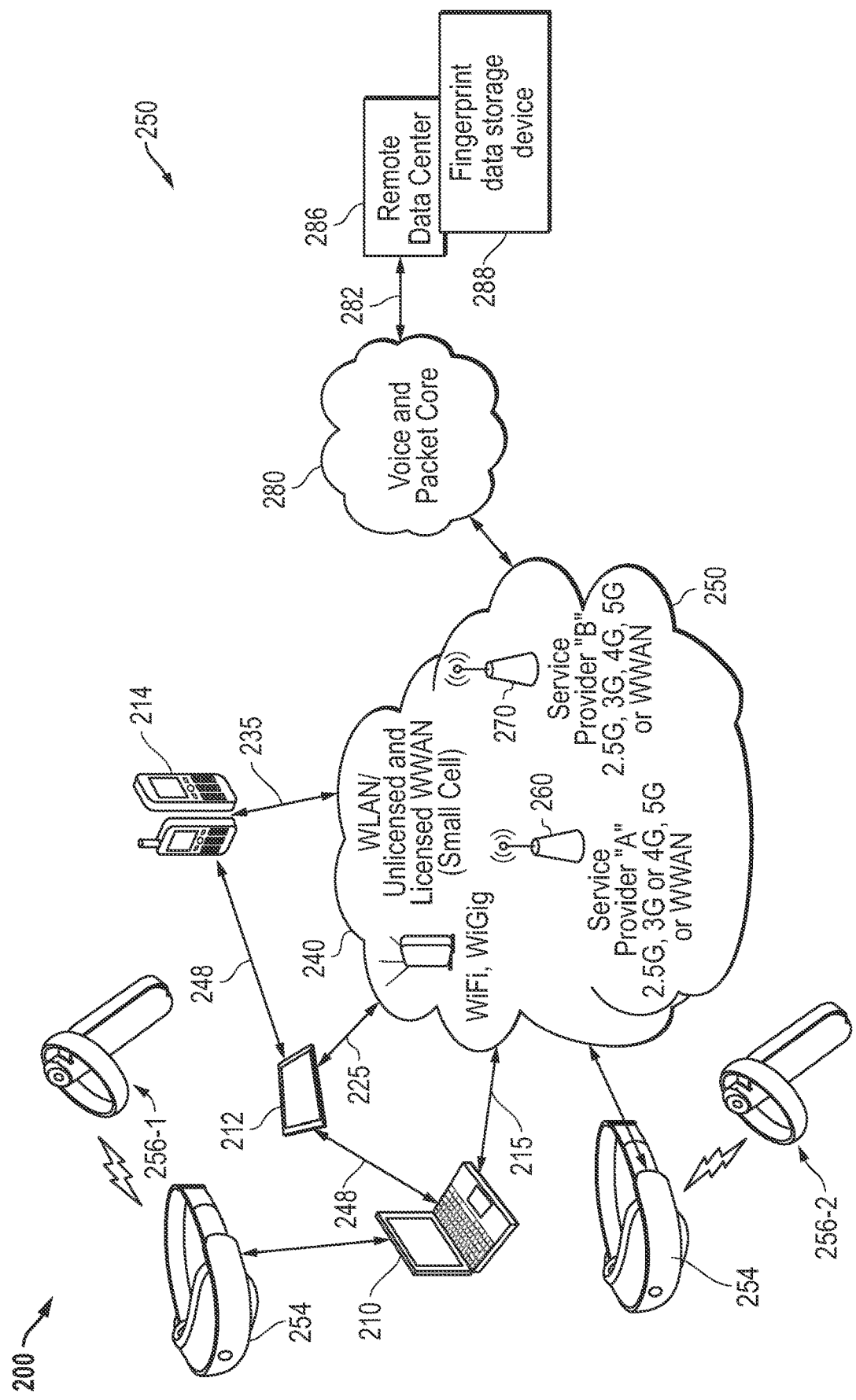
FIG. 2 is a block diagram of a network environment offering several communication protocol options and mobile information handling systems according to an embodiment of the present disclosure.

FIG. 2 illustrates a network 200 that can include one or more information handling systems 210, 212, 214. Additionally, one or more HMD devices 254 with XR handheld controllers 256-1, 256-2 operatively coupled to each of these HMD devices 254 may be operatively coupled, wired or wirelessly, to the network 200 either directly or indirectly via the one or more information handling systems 210, 212, 214. The information handling systems 210, 212, 214, HMD devices 254, and XR handheld controllers 256-1, 256-2 shown in FIG. 2 may be similar to the information handling system 100, HMD devices 154, and handheld controller 156 described in connection with FIG. 1, respectively. In a particular embodiment, network 200 includes networked mobile information handling systems 210, 212, 214, HMD devices 254, wireless network access points, and multiple wireless connection link options. A variety of additional computing resources of network 200 may include client mobile information handling systems, data processing servers, network storage devices, local and wide area networks, or other resources as needed or desired. As partially depicted, information handling systems 210, 212, 214 may be a laptop computer, tablet computer, 360-degree convertible systems, wearable computing devices, or a smart phone device. These information handling systems 210, 212, 214, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option.

Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network such as a voice and packet core 280. For example, wireless network access points (e.g., 136 FIG. 1) or base stations (e.g., 138, FIG. 1) may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, IEEE 802.11ax-2021, (e.g., Wi-Fi 6 and 6E, 6 GHz technologies), or emerging 5G small cell WWAN communications such as gNodeB, eNodeB, or similar wireless network protocols and access points. Alternatively, other available wireless links within network 200 may include macro-cellular connections 250 via one or more service providers 260 and 270. As described herein, a plurality of antennas may be operatively coupled to any of the macro-cellular connections 250 via one or more service providers 260 and 270 or to the wireless local area networks (WLANs) selectively based on the SAR data, RSSI data, configuration data, system operation and connection metrics, peripheral telemetry data, and antenna mounting locations (e.g., spatial locations of antennas within the information handling system) associated with each information handling systems 210, 212, 214 as described herein. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells. As described herein, utilization of RF communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 240, 250 may be based on the radio access network (RAN) standards that implement, for example, eNodeB or gNodeB hardware connected to mobile phone networks (e.g., cellular networks) used to communicate with the information handling systems 210, 212, 214 and HMD devices 254. In the example embodiment, mobile one or more information handling systems 210, 220, 230 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, an WWAN RF front end of the information handling systems 210, 212, 214 may operate on a licensed WWAN wireless radio with authorization for subscriber access to a wireless service provider on a carrier licensed frequency band. WLAN such as Wi-Fi (e.g., Wi-Fi 6) may be unlicensed.

In some embodiments, a networked mobile information handling system 210, 212, 214 and/or HMD devices 254 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or the plurality of antennas in each information handling systems 210, 212, 214 or HMD devices 254 may be used on each of the wireless communication devices such as according to embodiments herein and may be suited to plural RF bands. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96. Wi-Fi ISM frequency bands may be subject to sharing include 2.4 GHz, 60 GHz, 900 MHz or similar bands as understood by those of skill in the art. Within local portion of wireless network 250 access points for Wi-Fi or WiGig as well as small cell WWAN connectivity may be available in emerging 5G technology. This may create situations where a plurality of antenna systems that are operating on a mobile information handling system 210, 212, 214 via concurrent communication wireless links on both WLAN and WWAN radios and antenna systems. In some embodiments, concurrent wireless links may operate within the same, adjacent, or otherwise interfering communication frequency bands and may be required to utilize spaced antennas. The antenna may be a transmitting antenna that includes high-band, medium-band, low-band, and unlicensed band transmitting antennas in embodiments herein. The antenna may cooperate with other antennas in a N×N MIMO array configuration according to the embodiments described herein. Alternatively, embodiments may include a single transceiving antennas capable of receiving and transmitting, and/or more than one transceiving antennas. Each of the antennas included in the information handling systems 210, 212, 214 and/or HMD devices 254 in an embodiment may be subject to the FCC regulations on specific absorption rate (SAR).

The voice and packet core network 280 shown in FIG. 2 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile information handling systems such as 210, 212, 214, HMD devices 254, or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more information handling systems 210, 212, 214 and/or HMD devices 254. Alternatively, mobile information handling systems 210, 212, 214 and or HMD devices 254 may connect to the external network via base station locations at service providers such as 260 and 270. These service provider locations may be network connected via backhaul connectivity through the voice and packet core network 280.

Remote data centers 286 may include web servers or resources within a cloud environment that operate via the voice and packet core 280 or other wider internet connectivity. For example, remote data centers can include additional information handling systems, data processing servers, network storage devices, local and wide area networks, or other resources as needed or desired. In an embodiment, the remote data center 286 may include the machine data storage devices that store the computer code and instructions that define the fingerprint data storage 288 among other data. As described herein, in an embodiment, the remote data center 286 may also include remote processing resources such as a GPU (not shown) used to process XR environment data used to display an XR environment at the HMD devices 254.

Again, having such remote capabilities at the remote data center 286 may permit fewer resources to be maintained at the mobile information handling systems 210, 212, 214 or HMD devices 254 allowing streamlining and efficiency within those devices. In an embodiment, the remote information management system may be part of a 5G multi-edge compute server placed at an edge location on the network 200 for access by the information handling systems 210, 212, 214 and/or HMD devices 254. In an embodiment, the remote data center 286 permits fewer resources to be maintained in other parts of network 200. In an example embodiment, processing resources on the remote data center 286 may requests from HMD devices 254 to engage in XR environments. Although an information handling system 210, 212, 214 may be used to process some of the data used to provide a VR, AR, and/or MR environment to the displays of the HMD devices 254, the remote data center 286 may facilitate the information handling systems 210, 212, and 214 to perform those tasks described herein such as provisioning of an XR environment at the HMD devices 254 among other tasks described herein. In an example embodiment, the mobile information handling systems 210, 220, and 230 or HMD devices 254 may communicate with a backend server such as the remote data center 286 or other server on at least one radio access technology (RAT) network to execute other remote applications or access remote data, websites, or communications.

Although communication links 215, 225, and 235 are shown connecting wireless adapters of information handling systems 210, 212, 214 to wireless networks 240 or 250, a variety of wireless links are contemplated. Wireless communication may link through a wireless access point (e.g., Wi-Fi), through unlicensed WWAN small cell base stations such as in network 240 or through a service provider tower and base stations such as that shown with service provider A 260 or service provider B 270 and in network 250. In other aspects, mobile information handling systems 210, 212, 214 may communicate intra-device via inter-communication links 248 when one or more of the information handling systems 210, 212, 214 are set to act as an access point or even potentially an WWAN connection via small cell communication on licensed or unlicensed WWAN connections. For example, one of mobile information handling systems 210, 212, 214 may serve as a Wi-Fi hotspot in an embodiment. Concurrent wireless links to information handling systems 210, 212, 214 may be connected via any access points including other mobile information handling systems as illustrated in FIG. 2.

Figure 3:
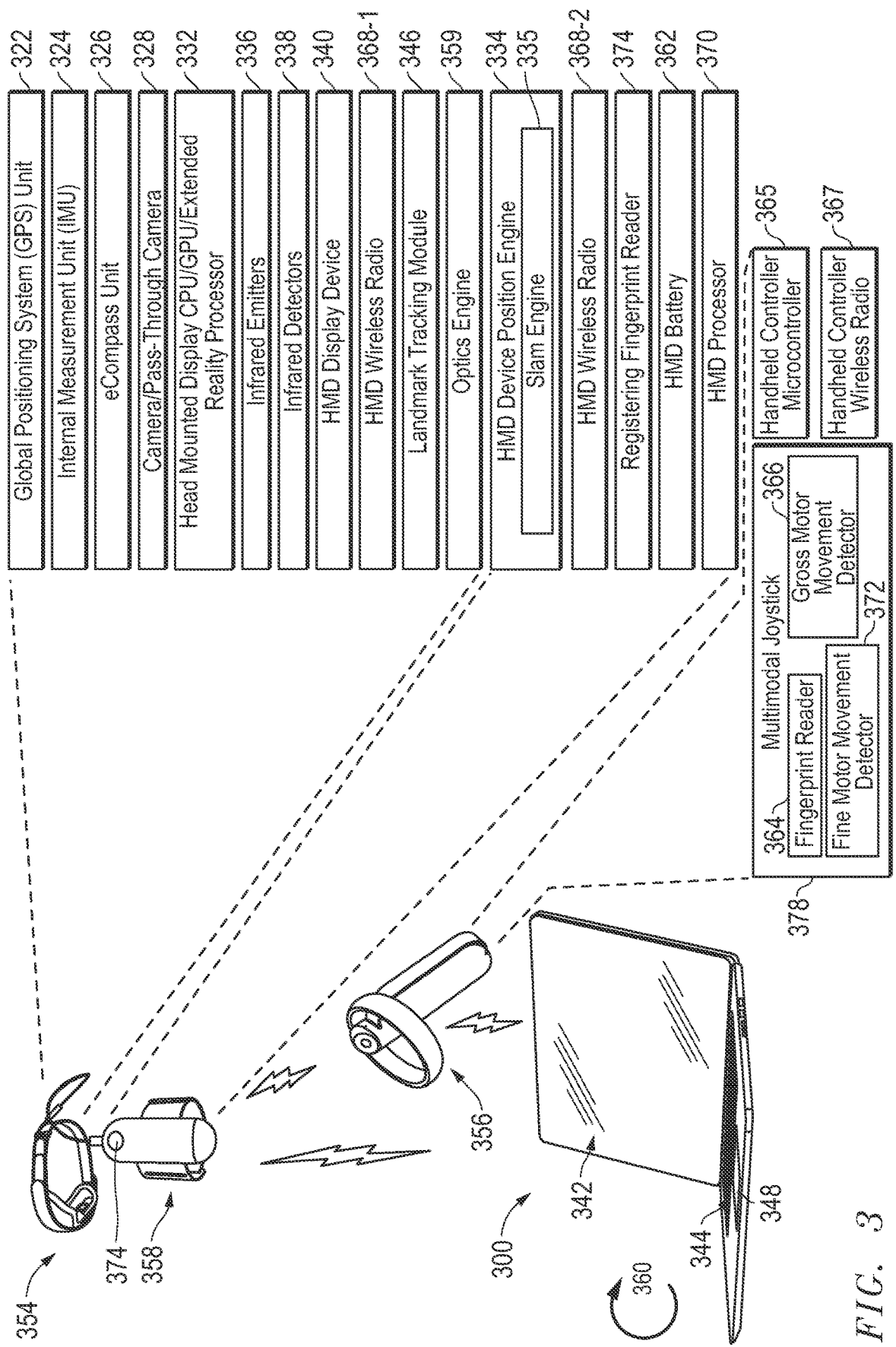
FIG. 3 is a block diagram illustrating an HMD device and extended reality (XR) handheld controller operatively coupled to an information handling system according to an embodiment of the present disclosure.

FIG. 3 is a block diagram illustrating an HMD device 354 and XR handheld controller 356 operatively coupled to an information handling system 300 according to an embodiment of the present disclosure. As described herein, the HMD device 354 may be communicatively coupled to the information handling system 300 either via a wired or wireless connection. In an embodiment, the information handling system 300 may be remote to the user operating the HMD device 354 or may be local with the information handling system 300 acting as an intermediary device to a remote information management system on a network as described herein.

As partially depicted, information handling system 300 may be a laptop computer such as a 360-degree convertible system. The information handling system 300 may interface with one or more input/output devices such as a keyboard 344, a mouse (not shown), a video/graphic display 342, a stylus (not shown), a trackpad 348, and XR handheld controller 356, or any combination thereof. These input/output devices may be used to communicate with the HMD device 354 which causes these devices to provide output to the user via, for example, a visual representation on the video/graphic display 342 of what the user sees when operating the HMD device 354. For example, the XR handheld controller 356 may be operatively coupled wirelessly or by wire to the HMD device 354, to the information handling system 300, or both. As described herein, the HMD device 354 may include an HMD wireless radio 368-1. The HMD wireless radio 368-1 or 368-2 may be used to operatively coupled the HMD device 354 to the XR handheld controller 356 and/or the information handling system 300. In an embodiment, the HMD device 354 and XR handheld controller 356 may be operatively coupled to one another and, optionally, to the information handling system 300 either via a wired or wireless connection such as Bluetooth or other protocol as described herein. In an embodiment, the HMD device 354 is operatively coupled to an HMD compute stick 358. The HMD compute stick 358 may also include an HMD wireless radio 368-2 used to operatively coupled the HMD device 354 to a network or to an information handling system 300 as well as provide communication between the XR handheld controller 356 and the HMD device 354. This HMD compute stick 358 may accomplish this by being operatively coupled to the HMD device 354 via a communication line as described herein.

The HMD device 354 may include any number of sensors used to determine the position of the HMD device 354 within an environment by executing, with a processor, the HMD device position engine 334. For example, the HMD device 354 in an embodiment may include positional sensors such as a global positioning system (GPS) unit 322, an inertial measurement unit (IMU) 324, an e-Compass unit 326, and/or other positional measurement tools such as an accelerometer, a capacitive transducer, a hall effect sensor, a laser doppler vibrometer, a multi-axis displacement transducer, a potentiometer, or a confocal chromatic sensor. Other positional sensors are also contemplated, including a capacitive displacement sensor, an eddy-current sensor, an ultrasonic sensor, a digital gyroscope, an inductive non-contact position sensor, a linear variable differential transformer, a photodiode array, a piezo-electric transducer, a proximity sensor, a rotary encoder, a seismic displacement pick-up, and a string potentiometer, along with any other positional sensors developed in the future. The positional sensors (e.g., GPS unit 322, IMU 324, and/or eCompass unit 326) in an embodiment may operate to measure location coordinates (x, y, z) of the HMD device 354, as well as orientation (θ), velocity, and/or acceleration. Velocity, acceleration, and trajectory of the HMD device 354 in such an embodiment may be determined by comparing a plurality of measured location coordinates and orientations taken over a known period of time, or may be measured directly by onboard positional sensor such as an accelerometer. Again, a SLAM process may be executed by a SLAM engine 335, in an embodiment as part of an HMD position engine 334, in order to identify the position of the HMD device 354 with respect to its surrounding environment, model the surrounding environment as viewed from the perspective of the headset wearer, and render the modeled image and virtual elements in a three-dimensional environment matching or relative to the surrounding real-world environment, among other tasks. The SLAM engine 335 and/or HMD position engine 334 may be executed by processors on the HMD device 354, the compute stick 358, or a combination thereof in some embodiments.

In another embodiment, the HMD device 354 may include or interact with other types of positional devices that provide data to the HMD device 354 to determine the location of the HMD device 354 within a physical environment. For example, an Internet-of-Things (IoT) device may include sensors that may be detectable by the HMD device 354 and which provide relative location data to the HMD device 354 that it is within a physical environment. This may include tags, transponders, or other location tags that can be used to triangulate the location of the HMD device 354 within the physical environment. Other sensors such as IR detectors 338 and IR emitters 336 or visible light versions of the same, for example, within either on the HMD device 354 (e.g., inward-out location detection) or located within the physical environment (e.g., outward-in location detection), may be used to triangulate or multilaterate the location of the HMD device 354 within the physical environment.

The HMD device 354 may also be capable of capturing video or still images of its surrounding physical environment, which may include one or more identifiable landmarks. For example, the HMD device 354 may include a camera such as a camera/pass-through camera 328. The camera/pass-through camera 328 may capture a two-dimensional image of the surrounding physical environment, which may be combined with distance measurements gathered by a plurality of IR emitters 336 and IR detectors 338 to generate a three-dimensional image of the surrounding environment as a reference for XR applications. The camera 328 in an embodiment may be, for example, a stereo triangulation camera, an Infrared (IR) camera, a sheet of light triangulation camera, a structured light camera, a time-of-flight or time-of-arrival camera, an interferometry camera, a coded aperture camera, a RGB digital camera, an infrared digital camera, a telephoto lens digital camera, a fish-eye digital camera, a wide-angle digital camera, a close-focus digital camera, or any other type of camera. The three-dimensional image captured by a camera/pass-through camera 328 in an embodiment may be used to determine the position and orientation of the HMD device 354 with respect to the one or more landmarks viewable within the physical environment for reference of motion in an AR, VR, or MR environment presented to a user of the HMD device 354. In an embodiment, the camera/pass-through camera 328 may be used for image recognition of gestures, or used with an XR handheld controller 356 to interact with an XR environment or content therein.

In an embodiment, the XR handheld controller 356 may also include IR detectors 338 and IR emitters 336 or visible light versions of the same, for example, for the HMD device 354 to detect the location of the XR handheld controller 356 relative to the HMD device 354. Again, the IR emitters or IR detectors on the XR handheld controller 356 either on the HMD device 354 (e.g., inward-out location detection) or located on the XR handheld controller 356 (e.g., outward-in location detection of XR handheld controller 356 relative to HMD devices 254), may be used to triangulate or multilaterate the location of the XR handheld controller 356 relative to the HMD devices 254 within the physical environment.

The HMD device 354 in an embodiment may further include an HMD CPU/GPU/XR processor 332 or other processor, which may execute instructions to provide images to the user via the HMD display device 340 of the HMD device 354. Such instructions executed by the HMD CPU/GPU/XR processor 332 or other processor in an embodiment may include those instructions used to create the VR environment, the AR environment, and/or the MR environment by projecting images to the user whether those images are superimposed over real-world images captured by the camera/pass-through camera 328 or not. These instructions may additionally or alternatively be executed by the HMD processor 370 on the compute stick 358 as an additional or alternative processing resource. In an embodiment, the HMD CPU/GPU/XR processor 332 or HMD processor 370 may also execute the gross motor movement detector system 366 and fine motor movement detector system 372 described herein. Alternatively, the XR handheld controller 356 may include a processing resource that executes the computer code defining the gross motor movement detector system 366 and fine motor movement detector system 372 described herein.

The HMD CPU/GPU/XR processor 332, HMD processor 370 on the compute stick 358, or other processor may also transmit an image of the surrounding environment captured by the camera/pass-through camera 328, the measured position (x, y, z), orientation (θ), velocity, and/or acceleration of the HMD device 354 to the wirelessly connected laptop or desktop information handling system 300 via a network adapter and a wireless radio 368 in an embodiment. The HMD CPU/GPU/XR processor 332, HMD processor 370 on the compute stick 358, or other processor may also receive SLAM frames indicating the positions of the HMD device 354 and one or more identified landmarks in the surrounding environment from the remotely connected laptop or desktop information handling system 300 via the network adapter.

The HMD CPU/GPU/XR processor 332, HMD processor 370 on the compute stick 358, or other processor in an such an embodiment may determine the position/orientation of identified landmarks with respect to the HMD device 354 through analysis of the positional information measured in the image captured by the camera 328 in combination with an identification by a landmark tracking module 346 of the one or more landmarks. In some embodiments, such positional/orientation information may be received at the HMD CPU/GPU/XR processor 332, HMD processor 370 on the compute stick 358, or other processor from the remotely located laptop or desktop information handling system 300 via a network adapter as described herein.

The HMD device 354 in an embodiment may further include one or more subsystems capable of identifying one or more landmarks within three-dimensional image information as described herein. For example, the HMD device 354 may include a landmark tracking module 346. The landmark tracking module 346 in an embodiment may access the three-dimensional image information of one or more nearby landmarks captured by the HMD device 354. In some embodiments, the landmark tracking module 346 may identify the physical boundaries of one or more potential landmarks within the three-dimensional image captured by the camera/pass-through camera 328. Once the physical boundaries of the landmarks are identified by the landmark tracking module 346 in an embodiment, the distance between these identified items and the HMD device 354 may be determined.

A plurality of IR emitters 336 may be mounted along the exterior of the HMD device 354 in an embodiment. Each IR emitters 336 (e.g., an infrared light emitting diode) in an embodiment may operate to emit infrared (IR) light toward the environment surrounding the HMD device 354. In some embodiments, the light emitted from each IR emitter 336 may be patterned, and each IR emitter 336 may emit the same pattern, or different IR emitters 336 may emit different patterns. The intensity of light emitted from each of the IR emitters 336 in an embodiment may be controlled by the HMD CPU/GPU/XR processor 332, a controller (not shown), or an integrated circuit or chip (not shown) executing firmware instructions of the IR emitters 336. Such firmware may also identify the position of each IR emitter 336 along the exterior of the HMD device 354 (e.g., position with respect to field of view of headset).

The HMD device 354 may further include one or more IR detectors 338 capable of detecting infrared light emitted from the plurality of IR emitters 336 reflecting off the surfaces of landmarks or objects within the environment surrounding the HMD device 354. IR detectors 338, in an embodiment, may be composed of IR light emitting detector or detector capable of generating an electrical current based on received or detected infrared light. Electrical currents generated by the plurality of IR detectors 338 in an embodiment may be used to determine a length of time during which light emitted from an IR emitter 336 traveled toward an object in the environment surrounding the HMD device 354, then travelled back toward the IR detector 338 upon reflection. This process is referred to a as time-of-flight detection process. In an embodiment, the IR detectors 338 may be used the XR handheld controller 356 as well to detect the position of the XR handheld controller 356. For example, the XR handheld controller 356 may include one or more IR emitters similar to the IR emitters 336 on the HMD device 354 that can be used by the IR detector 338 to detect the position of the XR handheld controller 356. The present specification further contemplates the use of visible light detectors or other handheld controller position detectors and HMD device 354 position detectors.

The HMD device 354 may further include one or more subsystems capable of mapping the positions/orientations of the HMD device 354 and one or more identified landmarks within a virtual three-dimensional environment in an embodiment. For example, the HMD device 354 may include a head mounted display (HMD) device position engine 334 that may include, in an embodiment, a simultaneous localization and mapping (SLAM) engine 335. The SLAM engine 335, in an embodiment, may access the position/orientation information for the one or more landmarks with respect to the HMD device 354 generated or received by the HMD CPU/GPU/XR processor 332 or HMD processor 370 on the compute stick 358, and use this information to generate a three-dimensional virtual map of HMD device 354 and its surrounding environment, including the one or more identified landmarks. In other embodiments, the HMD CPU/GPU/XR processor 332 or HMD processor 370 on the compute stick 358 may receive one or more SLAM frames including three-dimensional virtual maps of the HMD device 354 and its surrounding environment from the remotely located laptop or desktop information handling system 300 via a network adapter such as an HMD wireless radio 368-1 or 368-2.

In an embodiment, one or more subsystems capable of rendering an image of the surrounding physical environment or an XR image of the same or a new VR environment from the perspective of the HMD device 354 may also be included onboard the HMD device 354. For example, the HMD device 354 may include an optics engine 359, which may access the three-dimensional virtual map generated by the SLAM engine 335 or received from the remotely located information handling system 300 in an embodiment. The optics engine 359 in an embodiment may render a three-dimensional image of the surrounding environment including the identified one or more landmarks based on the location/orientation of the landmarks with respect to the HMD device 354 within the virtual map, as with a VR environment. In other embodiments, the optics engine 359 may render a three-dimensional image of an object projected to appear as if it is incorporated within the environment surrounding the HMD device 354, as with an AR environment or even a MR environment.

The HMD device 354 in an embodiment may further include one or more subsystems capable of and displaying the rendered image of the surrounding physical environment or a virtual XR environment with positions relative to a physical surrounding within the HMD device 354. For example, the HMD device 354 may include a head mounted HMD display device 340, capable of displaying the image (e.g., VR image, AR image, or MR image) rendered by the optics engine 359.

In an embodiment, the HMD device 354 may include an HMD compute stick 358. The HMD compute stick 358 may be used to remove some of the hardware typically located within a housing of the HMD device 354 to an offsite location. The HMD compute stick 358 may be operatively coupled to the HMD device 354 via a wired connection and may include, in an example embodiment, a separate body-mounting device to secure the HMD compute stick 358 to another portion of the user's body such as an arm. In an embodiment, the HMD compute stick 358 may include any type of hardware typically associated with the HMD device 354 such as the HMD processor 370, the HMD wireless radio 368-2, the data storage device used to store a user's fingerprint image, a power source such as an HMD battery 362, among other hardware. The HMD processor 370 may execute code instructions of any system independently or in combination with the HMD CPU/GPU/XR processor 332 of the HMD device 354 in various embodiments. This may include the HMD device position engine 334, the SLAM engine, and the optics engine 359, among others in various embodiments.

In an embodiment, the HMD compute stick 358 may further include a registering fingerprint reader 374. The registering fingerprint reader 374 may be used to initially register a user's fingerprint in the data storage device (e.g., 288, FIG. 2). As described herein, the user's detected fingerprint detected by the fingerprint reader 364 on the multimodal joystick 378 of the XR handheld controller 356 may be used to log the user into the HMD device 354 and allow the user to operate the HMD device 154. However, in order to initially register the user's fingerprint or event o log-in, the user may place the user's thumb on the registering fingerprint reader 374 in order to initially capture an image of the user's fingerprint, store the digital image of the user's fingerprint or biometric template of the user's fingerprint in the data storage device, and associate the user's identification with that fingerprint or complete a log in to the HMD device 354. This identification data may include a name, a birthdate, an address, a phone number, or an email address, among other identification data. The user may also be prompted, as a new user, to input a password or passcode and a username associated with the detected fingerprint and identification data. Once the user has provided this information, any subsequent detection of the user's fingerprint at the fingerprint reader 364 on the multimodal joystick 378 of the XR handheld controller 356 will automatically log the user into the HMD device 354. With the user's login setup and fingerprint registration, the user may also customize settings of the HMD 354 or XR controller 356 which may be saved for future log-ins via fingerprints. For example, selection of "A" button, "B" button or other button locations for button-push inputs or what button push inputs from those button designations may pertain to may be set within a user's log-in profile.

In an embodiment, the HMD device 354 may be operatively coupled to one or more XR handheld controllers 356. These XR handheld controllers 356 may allow a user of the HMD device 354 to interact with virtual objects displayed to the user in the XR surrounding environment such as grab virtual objects or move virtual objects. As described herein, the HMD device 354 may present to the user a VR environment, an MR environment, or an AR environment. The VR environment includes a complete virtual image presented to the user via the HMD display device 340 and may provide no real-world images (e.g., images of the physical environment around the HMD device 354) to the user concurrently via, for example, images obtained by a camera/pass-through camera 328 on the HMD device 354. The AR environment may include images of objects that are overlayed onto real world images presented to the user via the HMD display device 340 of the HMD device 354. The AR environment includes, in an embodiment, computer-generated perceptual information enhancing those real-world images (e.g., images of the physical environment around the HMD device 354) presented to the user via the HMD display device 340 of the HMD device 354. In an embodiment, this computer-generated perceptual information may include multiple sensory modalities such as visual, auditory, haptic, somatosensory and even olfactory modalities. The AR environment may, therefore, include a projection of real-world environment images (e.g., presented at the HMD display device 340 of the HMD device 354) with information or objects added virtually as an overlay. MR environments may include a merging of real-world images (e.g., images of the physical environment around the HMD device 354) captured by the camera/pass-through camera 328 and virtual, computer-generated images that are presented to the user. In an embodiment, unlike in AR, the user interacting in an MR environment may interact with the digital-objects presented to the user. The XR handheld controller 356 may include one or more input buttons that allow the user to perform various functions while viewing an XR environment such as the multimodal joystick 378 described herein. In an embodiment, the XR handheld controller 356 may communicate wirelessly with the HMD device 354 using, for example, a Bluetooth connection or some other wireless protocol as described herein.

The XR handheld controller 356 may further include one or more buttons, switches, triggers, and the like to allow the user to interact within the XR environment as described herein. In an embodiment, the XR handheld controller 356 includes a multimodal joystick 378. The multimodal joystick 378 may include, in an embodiment, a concave surface onto which the user may place a thumb or other finger. In an embodiment, the multimodal joystick 378 includes a fingerprint reader 364. The fingerprint reader 364 may detect the presence of a user's thumb on the multimodal joystick 378. The tilt of the multimodal joystick 378 may also be detected with a tilt sensor and provided to a handheld controller microcontroller 365 or transmitted to another processor such as HMD processor 370 or information handling system 300 and used to determine the mode of input for the multimodal joystick 378 as described herein. The detection of the user's fingerprint by the fingerprint sensor and the detected tilt of the multimodal joystick 378 help to determine the input mode of the multimodal joystick 378 as described herein. Determination of mode and either directional inputs or push-button inputs from the multimodal joystick 378 may be transmitted from the XR handheld controller 356 to the HMD device 358 via a handheld controller wireless radio 367. The multimodal joystick 378 may be actuated to move about a center pivot. This allows the multimodal joystick 378 to be tilted an amount along any direction within 360 degrees around the multimodal joystick 378. By way of example, a user may be interacting with a gaming application being executed at the HMD device 354 that allows a user to move about within the gaming XR environment. The multimodal joystick 378 when tilted in a left direction causes the user or an avatar representing the user within the XR environment to look or move to the left. Similarly, as the multimodal joystick 378 is tilted in any direction, the user or the avatar representing the user may look or be moved in that direction of tilt.

In an embodiment, when the user's thumb is detected as present by the fingerprint reader 364 (e.g., the user's fingerprint and the directional tilting of the multimodal joystick 378 is detected as described herein, this may be designated as gross motor movement directional input. To detect this gross motor movement, a processing resource such as the handheld controller microcontroller 365, the HMD CPU/GPU/XR processor 332 of the HMD device 354 or some combination in various embodiments may execute code instructions of a gross motor movement detector system 366 that detects the tilting of the multimodal joystick 378 in a direction and register that tilt as a gross motor movement. The handheld controller wireless radio 365 may transmit this data, such as gross motor movement directional inputs or the sensor-detected fingerprint presence data plus multimodal joystick tilt data in various embodiments, to the HMD device 354 or information handling system 300 to determine gross motor movement to be reflected in the XR environment. This gross motor movement may be replicated in the XR environment by causing, for example, the user or an avatar of the user to look or move within the XR environment in a rapid motion. In the example where a user is engaged in a first-person shooter gaming application at the HMD device 354, the gross motor movement detected by the execution of the gross motor movement detector system 366 may move an XR image or XR environment at a relatively quick speed. In an example embodiment, the more the user tilts the multimodal joystick 378, the quicker the user or avatar representing the user looks or moves within the XR environment. In an embodiment, the user may be presented with or be able to access settings that allow the user to adjust the gross movement when tilting the multimodal joystick 378. These settings may be presented to a user via a graphical user interface (GUI) with the HMD device 354 or at a video display device 342 of the information handling system 300. Although FIG. 3 shows the gross motor movement detector system 366 being present on the XR handheld controller 356, it is appreciated that the gross motor movement detector system 366 may be located on any hardware accessible by the HMD CPU/GPU/XR processor 332 in order to process the computer code defining the gross motor movement detector system 366. In an embodiment, the XR handheld controller 356 may include a processing resource that may execute the computer code defining the gross motor movement detector system 366.

The multimodal joystick 378, in an embodiment, further includes the fingerprint reader 364. In an embodiment, the fingerprint reader 364 may be placed at a center of the concave portion of the multimodal joystick 378. At this location, the fingerprint of the user or a portion of the fingerprint of the user may be detected by the fingerprint reader 364. The fingerprint reader 364 may implement any device (e.g., fingerprint scanner) used to detect the user's fingerprint including a digital camera and a digital processor to create a biometric template of the user's fingerprint in an embodiment.

In an embodiment, the scan of the user's fingerprint via the fingerprint reader 364 may also be initiated to identify the user. As described herein, the fingerprint scan of the user by the fingerprint reader 364 on the multimodal joystick 378 may allow the user to be identified and logged into the HMD device 354 so that the user may interact with the HMD device 354 and the XR environment presented to the user. Upon detection of a fingerprint by the fingerprint reader 364, in an embodiment, the handheld controller wireless radio 365 may transmit this data to the HMD device 354 or information handling system 300 to determine log in credentials based on the detected fingerprint. The fingerprint data may be used by a processor or embedded controller at the information handling system 300, the HMD CPU/GPU/XR processor 332 or other processing device (e.g., processor of the information handling system 300) to access a data storage device that maintains one or more fingerprints or biometric templates of one or more fingerprints for cross referencing. In some embodiments, this database of fingerprints may be maintained on the XR handheld controller 356 in memory there. This database of fingerprints in the data storage device may include one or more fingerprints along with identification data associated with each of those fingerprints. When the fingerprint is accessed and the identification of the user is determined, the user may be logged into the HMD device 354 if the user has been biometrically identified from the fingerprint reader 364 and may be used with the multimodal joystick 378 to detect the gross motor movement directional input, fine motor directional input, or push-button inputs as described herein.

The fingerprint reader 364 may also be used to detect fine motor movement across the surface of the multimodal joystick 378. As described herein, the fingerprint reader 364 may detect and capture an image of the user's fingerprint. Additionally, the fingerprint reader 364 may detect travel of the user's thumb across the fingerprint reader 364 by detecting changes, in real-time, in the images of the user's fingerprint. The HMD CPU/GPU/XR processor 332 or HMD processor 370 on the compute stick 358 of the HMD device 354 or the handheld controller microcontroller 365 or other processing resource of the XR handheld controller 356 may execute some or all code instructions of the fine motor movement detector system 372 to detect these changes in the fingerprint detected as the user moves the user's thumb across the fingerprint reader 364 where the changes indicate a direction of fine motor movement. The handheld controller wireless radio 365 may transmit this data, such as fine motor movement directional inputs or the sensor-detected fingerprint presence data and changes in fingerprint image plus an absence multimodal joystick tilt data in various embodiments, to the HMD device 354 or information handling system 300 to determine fine motor movement to be reflected in the XR environment. As the handheld controller microcontroller 365, the HMD CPU/GPU/XR processor 332 or other processing resource detects this fine motor movement, the user or an avatar of the user presented within the XR environment may look or move in fine movements. In the example embodiment where the gaming application is a first-person shooter gaming application being executed at the HMD device 354, the user may use the fine motor movement to, for example, finely move the user's gun so as to be accurately on target. In such an embodiment, the multimodal joystick 378 may not be detected as tilted or moved, and only thumb movement on the fingerprint reader 364 is detected, via detected fingerprint image changes, for fine motor movement directional input in an XR environment.

The fingerprint reader 364 may also be used to determine the mode of input at the multimodal joystick 378. As described herein, the multimodal joystick 378 may be used by the user to provide gross motor directional input by tilting the multimodal joystick 378 or fine motor movement directional input of the user's thumb across the fingerprint reader 364 with no tilting of the multimodal joystick 378 in one among a plurality of directions. This gross motor directional input or fine motor directional input is determined to be directional input when the fingerprint reader 364 detects the user's fingerprint on the multimodal joystick 378. However, the mode of operation of the multimodal joystick 378 changes when the fingerprint reader 364 does not detect the user's fingerprint (e.g., the user has removed the user's thumb from the surface of the multimodal joystick 378 and fingerprint reader 364). In an embodiment, when the fingerprint reader 364 does not detect the user's fingerprint but does detect that the multimodal joystick 378 has been tilted, the input may change to a push-button input. The handheld controller wireless radio 365 may transmit this data, such as push-button inputs or the sensor-detected fingerprint absence data plus multimodal joystick tilt data in various embodiments, to the HMD device 354 or information handling system 300 to determine push button actuation to be reflected in the XR environment. In some embodiments, lack of sensor-detected fingerprint presence data may be used with multimodal joystick tilt data instead of absence data, plus multimodal joystick tilt data to determine push-button input. For example, where the user's fingerprint is not being detected by the fingerprint reader 364 and the multimodal joystick 378 has been tilted to the left, this input may represent a push button of, for example, an "A" button of a gaming console. In this embodiment, the multimodal joystick 378 not only acts as a directional input device but also acts as a push-button input device depending on the detection, or not, of the user's fingerprint at the fingerprint reader 364. In another example embodiment, where the user's fingerprint is not detected at the fingerprint reader 364 and the multimodal joystick 378 is tilted to the right, this input may represent a push button of, for example, a "B" button such as on a gaming consol. With this second mode (e.g., a push-button input) of input being possible at the multimodal joystick 378 the multimodal joystick 378 may reduce the number of individual input buttons, triggers, and joysticks formed into the XR handheld controller 356. This may reduce the complexity of the XR handheld controller 356 to the user, reduce space necessary for the user to interact with all the input methods, and reduce the number of parts that may fail during use. Still further, with the multimodal joystick 378, the user may have a single location where input can be provided to interact within the XR environment reducing the finger movement necessary to do so. Additionally, the use of the multimodal joystick 378 with its fingerprint reader 364 allows a user to differentiate between fine motor movement directional inputs and gross motor movement directional inputs within the XR environment.

In an embodiment, the inward movement of the multimodal joystick 378 with the detection of the user's fingerprint on the fingerprint reader 364 provides a separate type of input. In an embodiment, the multimodal joystick 378 may be pressed down and into the housing of the XR handheld controller 356. This actuation of the multimodal joystick 378 may be different from other push-button actuations of the multimodal joystick 378 because the user's fingerprint is detected at the fingerprint reader 364 and the actuation is not along a perimeter of the multimodal joystick 378 and instead is directly down on the multimodal joystick 378. This center push-button input may serve as an additional input method. Such center push-button input data may be transmitted via the handheld controller wireless radio 365 to the HMD device 354 or information handling system 300 in various embodiments.

Figure 4:
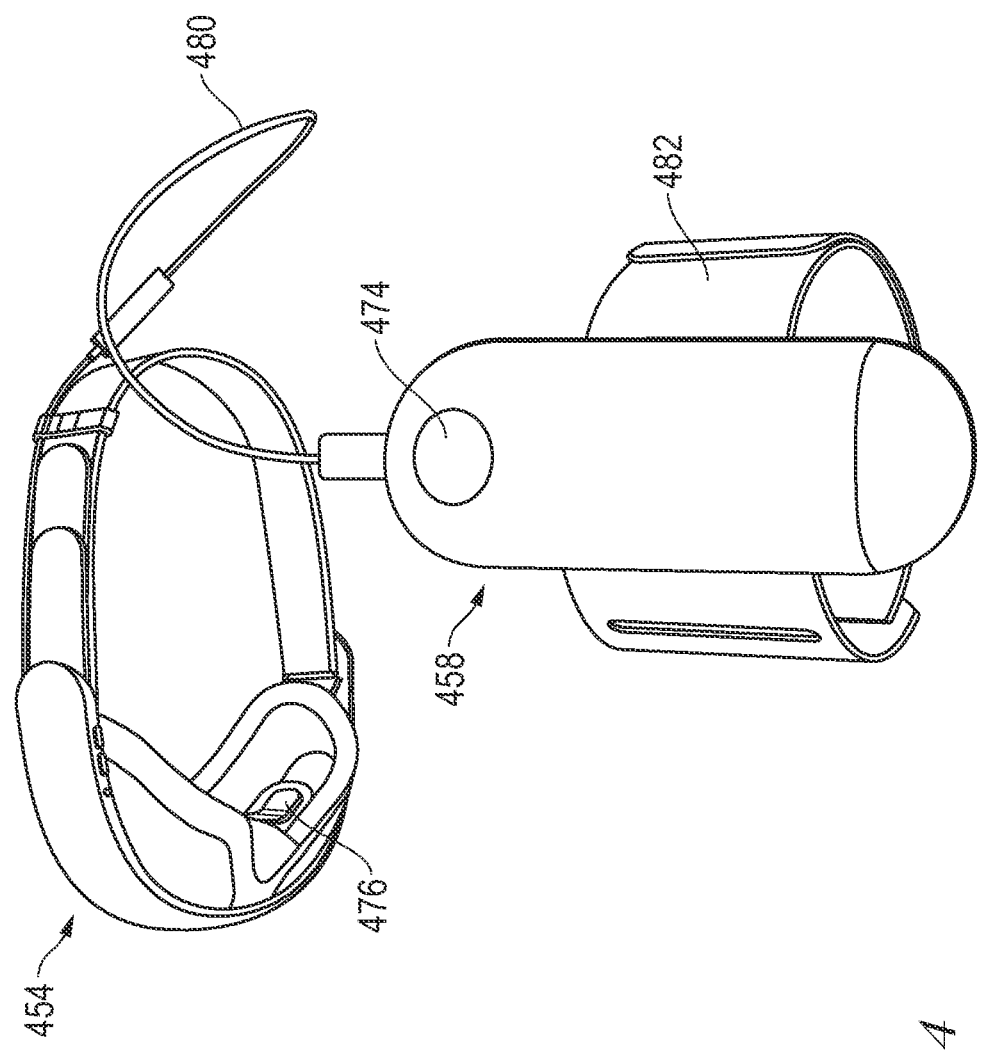
FIG. 4 is a graphic diagram illustrating an HMD device and HMD compute stick according to an embodiment of the present disclosure.

FIG. 4 is a graphic diagram illustrating an HMD device 454 and HMD compute stick 458 according to an embodiment of the present disclosure. FIG. 4 shows that the HMD device 454 is operatively coupled to the HMD compute stick 458 via a wired connection 480. This wired connection may allow the hardware components within the HMD device 454 and HMD compute stick 458 to rapidly communicate with each other in order to present to the user an XR environment at the HMD display device 476.

As described herein, in an embodiment the HMD compute stick 458 may be used to remove some of the hardware typically located within a housing of the HMD device 454 to an offsite location. This allows the weight of the HMD device 454 to be significantly reduced thereby increasing user satisfaction and comfort. The HMD compute stick 458 may include, in an example embodiment, a separate body-mounting device 482 to secure the HMD compute stick 458 to another portion of the user's body such as an arm. In the embodiment shown in FIG. 4, the body-mounting device 482 may include a stretchy or velcro cuff that may fit around a user's arm or wrist. In an embodiment, the HMD compute stick 458 may include any type of hardware typically associated with the HMD device 454 such as the HMD processor (not shown), the HMD wireless radio (not shown), the data storage device (not shown), a power source such as an HMD battery (not shown), among other hardware. In an embodiment, the HMD compute stick 458 may execute code instructions of any system in support of or in coordination with the HMD device 454 or the XR handheld controller for presenting any XR environment and interaction in various embodiments herein.

In an embodiment, the HMD compute stick 458 may further include a registering fingerprint reader 474. The registering fingerprint reader 474 may be used to initially register a user's fingerprint in the data storage device. As described herein, the user's detected fingerprint detected by a fingerprint reader on the multimodal joystick (not shown), or registering fingerprint reader 474 may be used to log the user into the HMD device 454 and allow the user to operate the HMD device 454. However, in order to initially register the user's fingerprint, the user may place the user's thumb on the registering fingerprint reader 474 in order to initially store the digital image of the user's fingerprint or biometric template of the user's fingerprint in the data storage device and associate the user's identification with that fingerprint. This identification data may include a name, a birthdate, an address, a phone number, or an email address, among other identification data. The user may also be prompted, as a new user, to input a password or passcode and a username associated with the detected fingerprint and identification data. Once the user has provided this information, any subsequent detection of the user's fingerprint at the fingerprint reader on the multimodal joystick of the XR handheld controller (not shown) or registering fingerprint reader 474 will automatically log the user into the HMD device 454.

Figure 5:
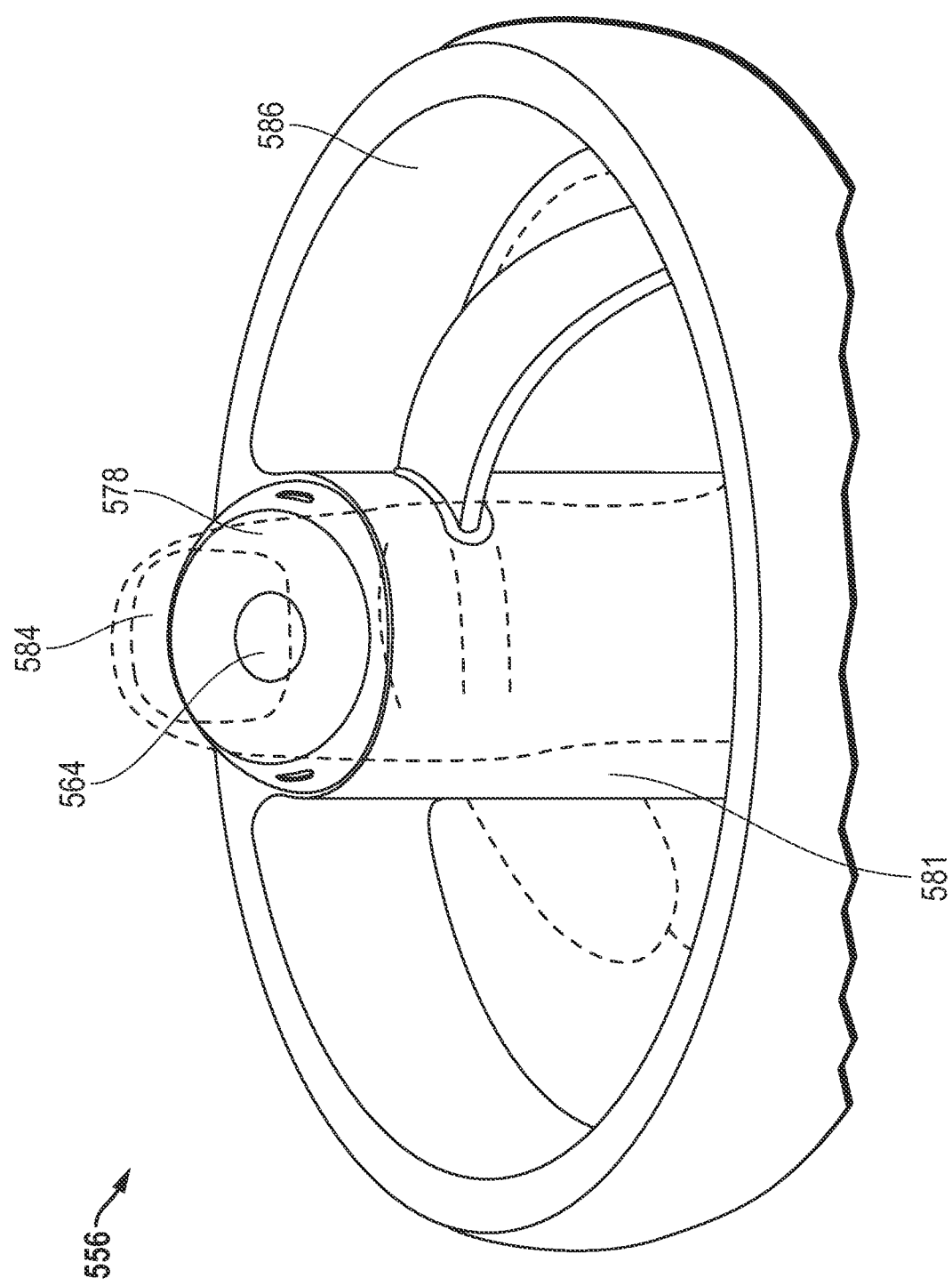
FIG. 5 is a graphic diagram illustrating an XR handheld controller with a multimodal joystick with an integrated fingerprint reader according to an embodiment of the present disclosure.

FIG. 5 is a graphic diagram illustrating an XR handheld controller 556 with a multimodal joystick 578 with an integrated fingerprint reader 564 according to an embodiment of the present disclosure. FIG. 5 shows a top portion of the XR handheld controller 556 where the user places a thumb 584 on the multimodal joystick 578 with an integrated fingerprint reader 564. The top portion of the XR handheld controller 556 may include a halo portion 586 that loops around a shaft or handle portion 581 of the XR handheld controller 556 at, in an example embodiment, the multimodal joystick 578. As described herein, the XR handheld controller 556 may include sensors such as IR detectors (not shown) and IR emitters (not shown) or visible light versions of the same located either within the HMD device (e.g., inward-out location detection) or located on the halo portion 586 of the XR handheld controller 556 (e.g., outward-in location detection), may be used to triangulate or multilaterate the location of the XR handheld controller 556 relative to the HMD device within the physical environment.

As described herein, the XR handheld controller 556 may include one or more buttons, switches, triggers, and the like to allow the user to interact within the XR environment as described herein. In an embodiment, the XR handheld controller 556 includes a multimodal joystick 578. The multimodal joystick 578 may include, in an embodiment, a concave surface onto which the user may place a thumb 584 or another finger. The multimodal joystick 578 may be actuated to move about a center pivot. This allows the multimodal joystick 578 to be tilted an amount along any direction within 360 degrees around the multimodal joystick 578. By way of example, a user may be interacting with a gaming application being executed at the HMD device that allows a user to move about within the gaming XR environment. The multimodal joystick 578 when tilted in a left direction causes the user or an avatar representing the user within the XR environment to look or move to the left. Similarly, as the multimodal joystick 578 is tilted in any direction, the user or the avatar representing the user may look or be moved in that direction of tilt.

In an embodiment, the directional tilting of the multimodal joystick 578 described herein may be defined as gross motor movement. To detect this gross motor movement, a processing resource (e.g., the HMD CPU/GPU/XR processor) of the XR handheld controller 556 in coordination with the HMD device may execute a gross motor movement detector system that detects the tilting of the multimodal joystick 578 in a direction and register that tilt as a gross motor movement. This gross motor movement may be replicated in the XR environment by causing, for example, the user or an avatar of the user to look or move within the XR environment in a rapid motion. In the example where a user is engaged in a first-person shooter gaming application at the HMD device, the gross motor movement detected by the execution of the gross motor movement detector system may move at a relatively quick speed. In an example embodiment, the more the user tilts the multimodal joystick 578, the quicker the user or avatar representing the user looks or moves within the XR environment.

The multimodal joystick 578, in an embodiment, further includes a fingerprint reader 564. In an embodiment, the fingerprint reader 564 may be placed at a center of the concave portion of the multimodal joystick 578. At this location, the fingerprint of the user's thumb 584 or a portion of the fingerprint of the user's thumb 584 may be detected by the fingerprint reader 564. The fingerprint reader 564 may implement any device (e.g., fingerprint scanner) used to detect the user's fingerprint including a digital camera and a digital processor to create a biometric template of the user's fingerprint or detect presence or movement of a user's thumb or finger in some embodiments.

In an embodiment, the scan of the user's fingerprint via the fingerprint reader 564 may also be initiated to identify the user. As described herein, the fingerprint scan of the user by the fingerprint reader 564 on the multimodal joystick 578 may allow the user to be identified and logged into the HMD device so that the user may interact with the HMD device and the XR environment presented to the user. Upon detection of a fingerprint by the fingerprint reader 564, in an embodiment, the HMD CPU/GPU/XR processor, the XR handheld controller processor, or other processing device (e.g., processor of the information handling system) may access a data storage device that maintains one or more fingerprints or biometric templates of one or more fingerprints. This database of fingerprints in the data storage device may include one or more fingerprints along with identification data associated with each of those fingerprints. When the fingerprint is accessed and the identification of the user is determined, the user may be logged into the HMD device if the user has been biometrically identified.

The fingerprint reader 564 may also be used to detect fine motor movement across the surface of the multimodal joystick 578. As described herein, the fingerprint reader 564 may detect and capture an image of the user's fingerprint to indicate presence (or absence) of the thumb or finger in an embodiment. Additionally, the fingerprint reader 564 may detect travel of the user's thumb across the fingerprint reader 564 by detecting changes, in real-time, in the images of the user's fingerprint in an embodiment. In this embodiment, the user may move the user's thumb 584 within the concave portion of the multimodal joystick 578 to create this fine motor movement. As the fingerprint image changes to show more of a left portion of the user's thumb 584, this is detected as right fine directional movement input if the multimodal joystick 578 has not been tilted or moved in one embodiment. As the fingerprint image changes to show more of a right portion of the user's thumb 584, this is detected as left fine directional movement input if the multimodal joystick 578 has not been tilted or moved in one embodiment. Further, as the fingerprint image changes to show more of a top portion of the user's thumb 584, this is detected as downward fine directional movement input if the multimodal joystick 578 has not been tilted or moved in one embodiment. Still further, as the fingerprint image changes to show more of a bottom portion of the user's thumb 584, this is detected as upward fine directional movement input if the multimodal joystick 578 has not been tilted or moved in one embodiment.

The HMD CPU/GPU/XR processor of the HMD device, the XR handheld controller microcontroller, or another processing resource of the XR handheld controller 556 or the HMD device may execute the fine motor movement detector system to detect these changes in the fingerprint detected as the user moves the user's thumb across the fingerprint reader 564. As the HMD CPU/GPU/XR processor, the XR handheld controller microcontroller, or another processing resource detects this fine motor movement, the user or an avatar of the user presented within the XR environment may look or move in fine movements. In the example embodiment where the gaming application is a first-person shooter gaming application being executed at the HMD device, the user may use the fine motor movement to, for example, finely move the user's gun so as to be accurately on target.

The fingerprint reader 564 may also be used to determine the mode of input at the multimodal joystick 578. As described herein, the multimodal joystick 578 may be used by the user to provide gross motor directional input by tilting the multimodal joystick 578 in one among a plurality of directions. This gross motor directional input is determined to be directional input when the fingerprint reader 564 detects the user's fingerprint on the multimodal joystick 578. However, the mode of operation of the multimodal joystick 578 changes when the fingerprint reader 564 does not detect the user's fingerprint (e.g., the user has removed the user's thumb 584 from the surface of the multimodal joystick 578 and fingerprint reader 564). In an embodiment, when the fingerprint reader 564 does not detect the user's fingerprint but does detect that the multimodal joystick 578 has been tilted, the input may change to a push-button input. For example, where the user's fingerprint is not being detected by the fingerprint reader 564 and the multimodal joystick 578 has been tilted to the left with a right side of the user's thumb 584, this input may represent a push button of, for example, an "A" button. In this embodiment, the multimodal joystick 578 not only acts as a directional input device but also acts as a push-button input device depending on the detection, or not, of the user's fingerprint at the fingerprint reader 564. In another example embodiment, where the user's fingerprint is not detected at the fingerprint reader 564 and the multimodal joystick 578 is tilted to the right with the user using a left side of the user's thumb 584, this input may represent a push button of, for example, a "B" button. In yet another example embodiment, where the user's fingerprint is not detected at the fingerprint reader 564 and the multimodal joystick 578 is tilted downward with the user using a tip of the user's thumb 584, this input may represent a push button of, for example, a "C" button. It is appreciated that, in an example embodiment, that the multimodal joystick 578 may be divided into quadrants with each quadrant being assigned a specific push-button input. In other embodiments, the multimodal joystick 578 tilting directions may be further divided to allow for more push-button input to be received at different tilt angles of the multimodal joystick 578.

In an embodiment, the inward movement of the multimodal joystick 578 with the detection of the user's fingerprint on the fingerprint reader 564 provides a separate type of input. In an embodiment, the multimodal joystick 578 may be pressed down and into the housing of the XR handheld controller 556. This actuation of the multimodal joystick 578 may be different from other push-button actuations of the multimodal joystick 578 because the user's fingerprint is detected at the fingerprint reader 564 and the actuation is not along a perimeter of the multimodal joystick 578 and instead is directly down on the multimodal joystick 578. This center push-button input may serve as an additional input method.

With this second mode (e.g., a push-button input) of input being possible at the multimodal joystick 578 the multimodal joystick 578 may reduce the number of individual input buttons, triggers, and joysticks formed into the XR handheld controller 556. This may reduce the complexity of the XR handheld controller 556 to the user, reduce space necessary for the user to interact with all the input methods, and reduce the number of parts that may fail during use. Still further, with the multimodal joystick 578, the user may have a single location where input can be provided to interact within the XR environment reducing the finger movement necessary to do so. Additionally, the use of the multimodal joystick 578 with its fingerprint reader 564 allows a user to differentiate between fine motor movements and gross motor movements within the XR environment.

Figure 6:
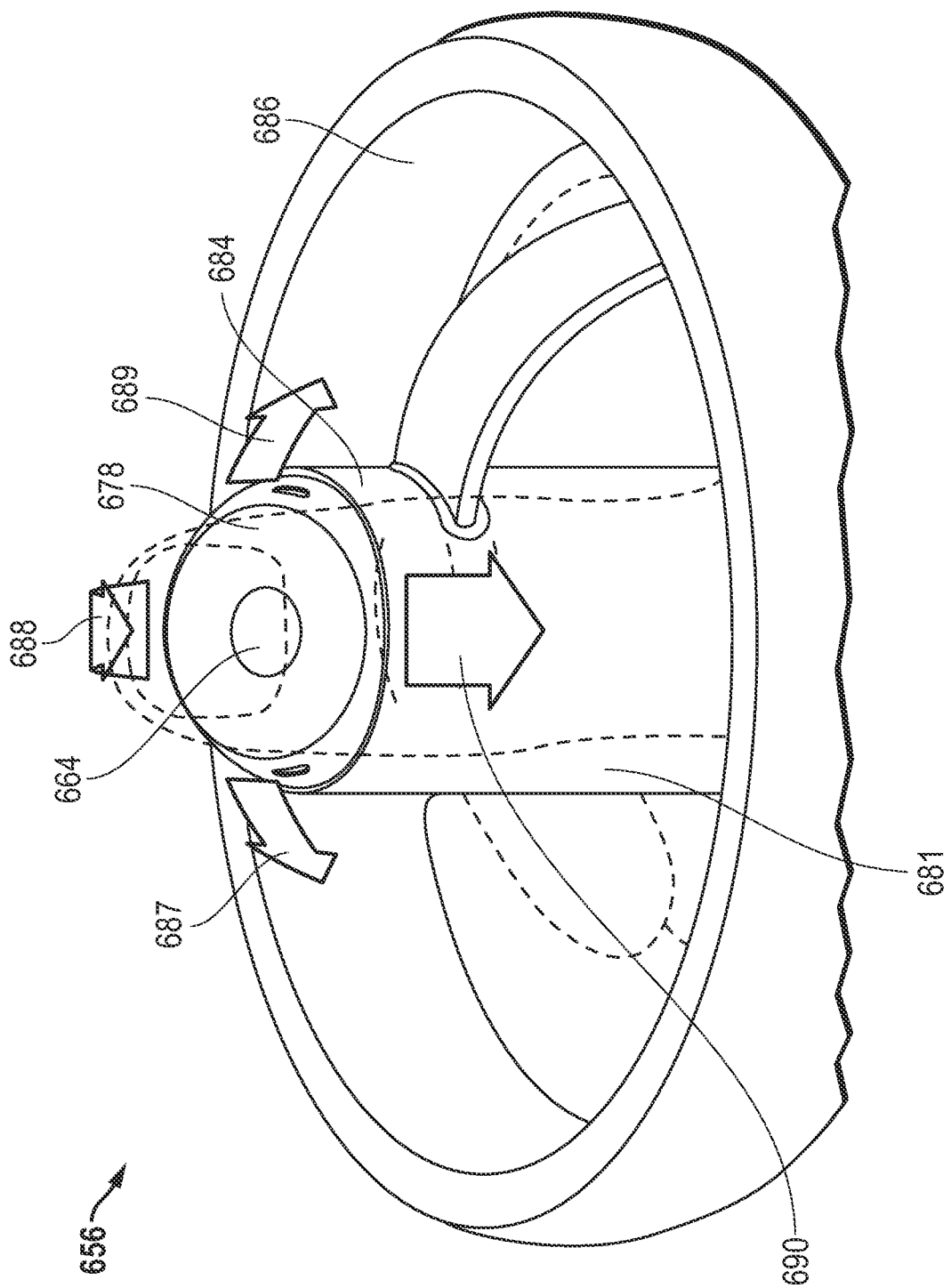
FIG. 6 is a graphic diagram illustrating an XR handheld controller with a multimodal joystick and integrated fingerprint reader according to another embodiment of the present disclosure.

FIG. 6 is a graphic diagram illustrating an XR handheld controller with a multimodal joystick 678 and an integrated fingerprint reader 664 according to another embodiment of the present disclosure. FIG. 6 also shows a top portion of the XR handheld controller 656 where the user places a thumb 684 on the multimodal joystick 678 and integrated fingerprint reader 664. The top portion of the XR handheld controller 656 may include a halo portion 686 that loops around a shaft or handle portion 681 of the XR handheld controller 656 at, in an example embodiment, the multimodal joystick 678. As described herein, the XR handheld controller 656 may include sensors such as IR detectors (not shown) and IR emitters (not shown) or visible light versions of the same located either within the HMD device (e.g., inward-out location detection) or located on the halo portion 686 of the XR handheld controller 656 (e.g., outward-in location detection), may be used to triangulate or multilaterate the location of the XR handheld controller 656 relative to the HMD device within the physical environment.

FIG. 6 also shows four directional arrows: a left directional arrow 687, a top directional arrow 688, a right directional arrow 689, and a bottom directional arrow 690. These directional arrows 687, 688, 689, 670 show directions for directional input that the multimodal joystick 678 may be tilted or the thumb 684 may be moved across fingerprint reader 664. However, it is appreciated that the multimodal joystick 678 may be tilted or the thumb 684 may be moved across the fingerprint reader 664 in any direction including those directions between the directional arrows 687, 688, 689, 670 shown in FIG. 6.

Again, the XR handheld controller 656 includes the multimodal joystick 678. The multimodal joystick 678 may include, in an embodiment, a concave surface onto which the user may place a thumb 684 or another finger. The multimodal joystick 678 may be actuated to move about a center pivot. This allows the multimodal joystick 678 to be tilted an amount along any direction within 360 degrees around the multimodal joystick 678 including those directions between the directional arrows 687, 688, 689, 670. By way of example, a user may be interacting with a gaming application being executed at the HMD device that allows a user to move about within the gaming XR environment. The multimodal joystick 678 when tilted in a left direction causes the user or an avatar representing the user within the XR environment to look or move to the left. Similarly, as the multimodal joystick 678 is tilted in any direction, the user or the avatar representing the user may look or be moved in that direction of tilt.

In an embodiment, the directional tilting of the multimodal joystick 678 described herein may be defined as gross motor movement. To detect this gross motor movement, a processing resource (e.g., the HMD CPU/GPU/XR processor) of the HMD device or XR handheld controller 656 may execute a gross motor movement detector system that detects the tilting of the multimodal joystick 678 in a direction (e.g., directional arrows 687, 688, 689, 670 and those directions in between) and register that tilt as a gross motor movement when the user's thumb 684 is detected. This gross motor movement may be replicated in the XR environment by causing, for example, the user or an avatar of the user to look or move within the XR environment in a rapid motion. In the example where a user is engaged in a first-person shooter gaming application at the HMD device, the gross motor movement detected by the execution of the gross motor movement detector system may move at a relatively quick speed. In an example embodiment, the more the user tilts the multimodal joystick 678, the quicker the user or avatar representing the user looks or moves within the XR environment.

The multimodal joystick 678, in an embodiment, further includes the fingerprint reader 664. In an embodiment, the fingerprint reader 664 may be placed at a center of the concave portion of the multimodal joystick 678. At this location, the fingerprint of the user's thumb 684 or a portion of the fingerprint of the user's thumb 684 may be detected by the fingerprint reader 664 as present (or absent). The fingerprint reader 664 may implement any device (e.g., fingerprint scanner) used to detect the user's fingerprint including a digital camera and a digital processor to create a biometric template of the user's fingerprint in an embodiment.

In an embodiment, the scan of the user's fingerprint via the fingerprint reader 664 may also be initiated to identify the user. As described herein, the fingerprint scan of the user by the fingerprint reader 664 on the multimodal joystick 678 may allow the user to be identified and logged into the HMD device so that the user may interact with the HMD device and the XR environment presented to the user. Upon detection of a fingerprint by the fingerprint reader 664, in an embodiment, the HMD CPU/GPU/XR processor or other processing device (e.g., processor of the XR handheld controller or the information handling system) may access a data storage device that maintains one or more fingerprints or biometric templates of one or more fingerprints. This database of fingerprints in the data storage device may include one or more fingerprints along with identification data associated with each of those fingerprints. When the fingerprint is accessed and the identification of the user is determined, the user may be logged into the HMD device if the user has been biometrically identified.

The fingerprint reader 664 may also be used to detect fine motor movement input across the surface of the multimodal joystick 678. As described herein, the fingerprint reader 664 may detect and capture an image of the user's fingerprint. Additionally, the fingerprint reader 664 may detect travel of the user's thumb across the fingerprint reader 664 by detecting changes, in real-time, in the images of the user's fingerprint. In this embodiment, the user may move the user's thumb 684 within the concave portion of the multimodal joystick 678 to create this fine motor movement. As the fingerprint image changes to show more of a left portion of the user's thumb 684, this is detected as right fine directional movement input if the multimodal joystick 678 has not been tilted or moved in one embodiment. As the fingerprint image changes to show more of a right portion of the user's thumb 684, this is detected as left fine directional movement input if the multimodal joystick 678 has not been tilted or moved in one embodiment. Further, as the fingerprint image changes to show more of a top portion of the user's thumb 684, this is detected as downward fine directional movement input if the multimodal joystick 678 has not been tilted or moved in one embodiment. Still further, as the fingerprint image changes to show more of a bottom portion of the user's thumb 684, this is detected as upward fine directional movement input if the multimodal joystick 678 has not been tilted or moved in one embodiment. The HMD CPU/GPU/XR processor of the HMD device or a processing resource of the XR handheld controller 656 may execute the fine motor movement detector system to detect these changes in the fingerprint detected as the user moves the user's thumb across the fingerprint reader 664. As the HMD CPU/GPU/XR processor or other processing resource detects this fine motor movement, the user or an avatar of the user presented within the XR environment may look or move in fine movements. In the example embodiment where the gaming application is a first-person shooter gaming application being executed at the HMD device, the user may use the fine motor movement to, for example, finely move the user's gun so as to be accurately on target.

The fingerprint reader 664 may also be used to determine the mode of input at the multimodal joystick 678. As described herein, the multimodal joystick 678 may be used by the user to provide directional input by tilting the multimodal joystick 678 in one among a plurality of directions. This gross motor directional input is determined to be directional input when the fingerprint reader 664 detects the user's fingerprint on the multimodal joystick 678. However, the mode of operation of the multimodal joystick 678 changes when the fingerprint reader 664 does not detect the user's fingerprint (e.g., the user has removed the user's thumb from the surface of the multimodal joystick 678 and fingerprint reader 664). In an embodiment, when the fingerprint reader 664 does not detect the user's fingerprint but does detect that the multimodal joystick 678 has been tilted, the input may change to a push-button input. For example, where the user's fingerprint is not being detected by the fingerprint reader 664 and the multimodal joystick 678 has been tilted to the left (e.g., the left directional arrow 687) with a right side of the user's thumb 684, this input may represent a push button of, for example, an "A" button. In this embodiment, the multimodal joystick 678 not only acts as a directional input device but also acts as a push-button input device depending on the detection, or not, of the user's fingerprint at the fingerprint reader 664. In another example embodiment, where the user's fingerprint is not detected at the fingerprint reader 664 and the multimodal joystick 678 is tilted to the right (e.g., the top directional arrow 688) with the user using a left side of the user's thumb 684, this input may represent a push button of, for example, a "B" button. In yet another example embodiment, where the user's fingerprint is not detected at the fingerprint reader 664 and the multimodal joystick 678 is tilted downward (e.g., the bottom directional arrow 690) with the user using a tip of the user's thumb 684, this input may represent a push button of, for example, a "C" button. It is appreciated that, in an example embodiment, that the multimodal joystick 678 may be divided into quadrants (e.g., directional arrows 687, 688, 689, 670) with each quadrant being assigned a specific push-button input. In other embodiments, the multimodal joystick 678 tilting directions may be further divided to allow for more push-button input to be received at different tilt angles of the multimodal joystick 678.

In an embodiment, the inward movement of the multimodal joystick 678 with the detection of the user's fingerprint on the fingerprint reader 664 provides a separate type of input. In an embodiment, the multimodal joystick 678 may be pressed down and into the housing of the XR handheld controller 656. This actuation of the multimodal joystick 678 may be different from other push-button actuations of the multimodal joystick 678 because the user's fingerprint is detected at the fingerprint reader 664 and the actuation is not along a perimeter of the multimodal joystick 678 and instead is directly down on the multimodal joystick 678. This center push-button input may serve as an additional input method.

With this additional mode (e.g., a push-button input) of input being possible at the multimodal joystick 678 the multimodal joystick 678 may reduce the number of individual input buttons, triggers, and joysticks formed into the XR handheld controller 656. This may reduce the complexity of the XR handheld controller 656 to the user, reduce space necessary for the user to interact with all the input methods, and reduce the number of parts that may fail during use. Still further, with the multimodal joystick 678, the user may have a single location where input can be provided to interact within the XR environment reducing the finger movement necessary to do so. Additionally, the use of the multimodal joystick 678 with its fingerprint reader 664 allows a user to differentiate between fine motor movements and gross motor movements within the XR environment.

Figure 7:
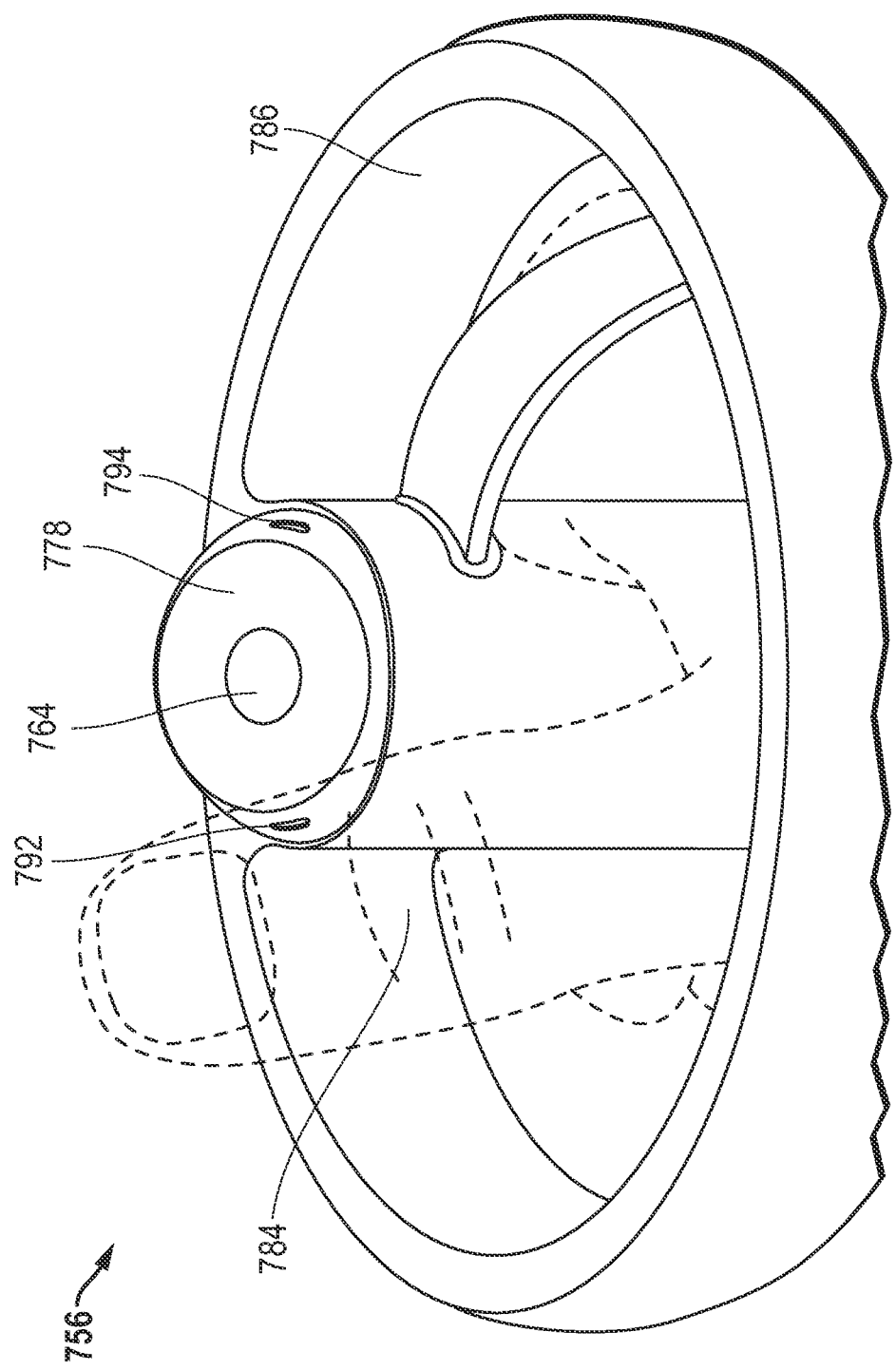
FIG. 7 is a graphic diagram illustrating an XR handheld controller with a multimodal joystick and integrated fingerprint reader according to yet another embodiment of the present disclosure.

FIG. 7 is a graphic diagram illustrating an XR handheld controller 756 with a multimodal joystick 778 with and integrated fingerprint reader 764 according to another embodiment of the present disclosure. FIG. 7 also shows a top portion of the XR handheld controller 756 where the user places a thumb 784 along a side of the multimodal joystick 778 and integrated fingerprint reader 764. The top portion of the XR handheld controller 756 may include a halo portion 786 that loops around a portion of the XR handheld controller 756 at, in an example embodiment, the multimodal joystick 778. As described herein, the XR handheld controller 756 may include sensors such as IR detectors (not shown) and IR emitters (not shown) or visible light versions of the same located either within the HMD device (e.g., inward-out location detection) or located on the halo portion 786 of the XR handheld controller 756 (e.g., outward-in location detection), may be used to triangulate or multilaterate the location of the XR handheld controller 756 relative to the HMD device within the physical environment.

As described herein, the multimodal joystick 778 when tilted in a right direction and when the user's thumb 784 is detected on the fingerprint reader 764 is gross motor movement directional input and causes the user or an avatar representing the user within the XR environment to look or move to the right. Similarly, as the multimodal joystick 778 is tilted in any direction and the user's thumb 784 is detected on the fingerprint reader 764, the user or the avatar representing the user may look or be moved in that direction of tilt.

However, FIG. 7 shows a right side of the user's thumb 784 engaging the left side of the multimodal joystick 778 to tilt it to the right. When the user's thumb 784 is not on the fingerprint reader 764 and the multimodal joystick 778 is tilted in a direction (e.g., to the right as shown in FIG. 7), the input mode changes. For example, where the user's fingerprint is not being detected by the fingerprint reader 764 and the multimodal joystick 778 has been tilted to the right with a right side of the user's thumb 784, this input may represent a push button of, for example, an "A" button or any other assigned or assignable button input. Thus, in this embodiment, the multimodal joystick 778 not only acts as a fine motor and a gross motor directional input device but also acts as a push-button input device depending on the detection, or not, of the user's fingerprint at the fingerprint reader 764. In an embodiment, the multimodal joystick 778 may include tactile nodules 792, 794 that the user can use as tactile landmarks to determine in which direction the push-button input can be received.

Although the present describes specific push-button input being assigned based on the direction that the multimodal joystick 778 is tilted with the user's thumb 784 which is also detected as absent from or just not detected by the fingerprint reader 764, the present specification contemplates that any push-button input may be assigned or assignable to these push-button inputs. In an embodiment, the user may be allowed to change the input assigned to these push-button inputs. In an example embodiment, the user may be presented with a GUI at the HMD device that allows a user to assign a specific push-button input to the multimodal joystick 778 based on which direction the user tilts the multimodal joystick 778 with the user's thumb 784 off the fingerprint reader 764.

In an embodiment, the movement of the multimodal joystick 778 with the detection of the user's fingerprint on the fingerprint reader 764 provides a separate type of input. In an embodiment, the multimodal joystick 778 may be pressed down and into the housing of the XR handheld controller 756. This actuation of the multimodal joystick 778 may be different from other push-button actuations of the multimodal joystick 778 because the user's fingerprint is detected at the fingerprint reader 764 and the actuation is not a joystick tile from along a perimeter of the multimodal joystick 778 and instead is directly down on the multimodal joystick 778. This center push-button input may serve as an additional input method.

Figure 8:
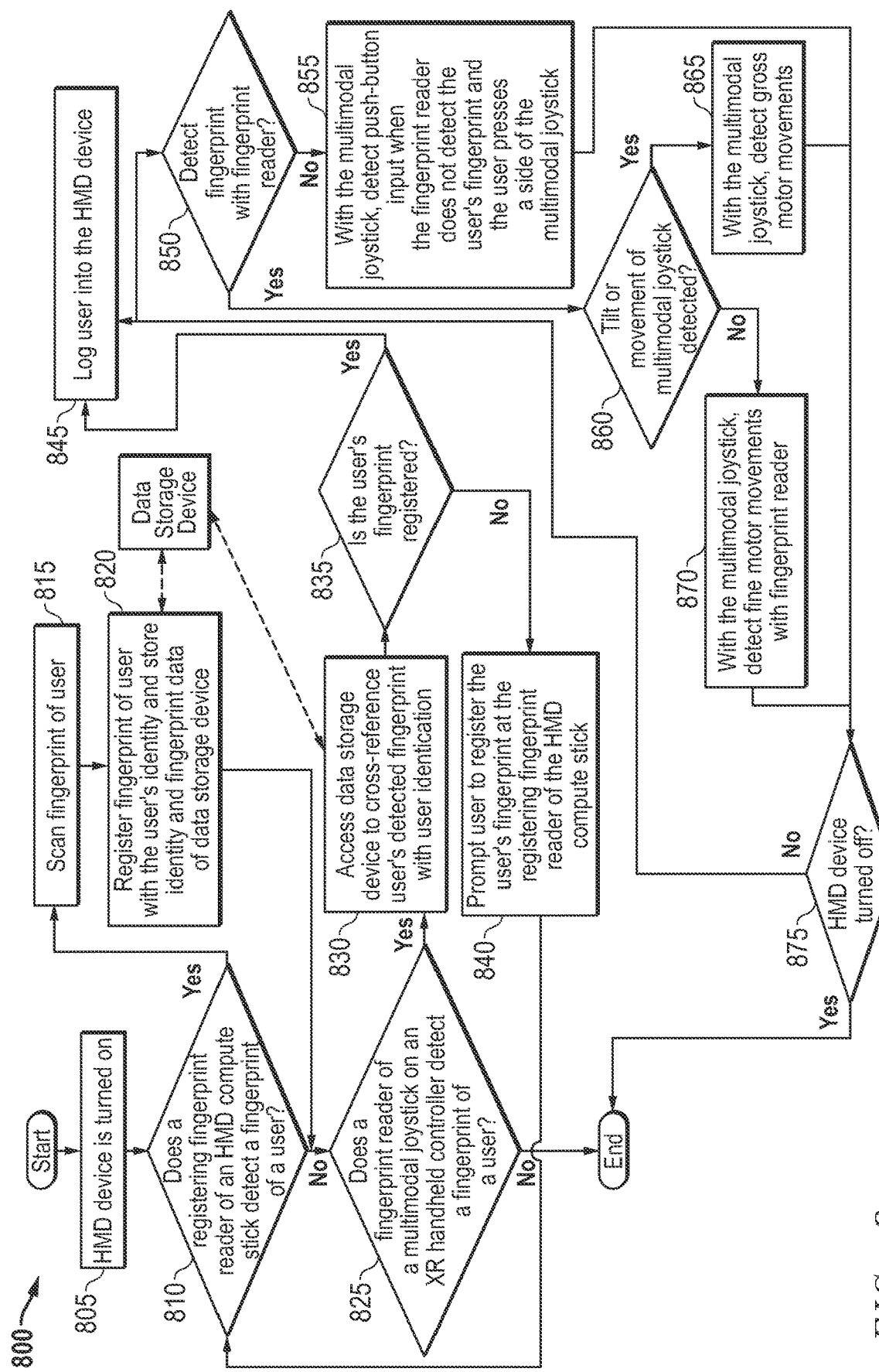
FIG. 8 is a flow diagram illustrating a method of receiving input from an XR handheld controller operatively coupled to an HMD device according to an embodiment of the present disclosure.

FIG. 8 is a flow diagram illustrating a method 800 of receiving input from an XR handheld controller operatively coupled to an HMD device according to an embodiment of the present disclosure. The method 800 may be executed by the XR handheld controller and HMD device operatively coupled to an information handling system similar to that described in connection with FIGS. 1, 2, and 3 according to various embodiments herein.

The method 800 may include, at block 805, with turning on the HMD device and, optionally, a HMD computer stick in an embodiment. In an embodiment, the HMD device may include its own power source such as a battery or A/C power adapter. In another embodiment, the HMD device may be operatively coupled to an information handling system via a wired connection that may provide power to the HMD device as well as communication between the HMD device and the information handling system. In an embodiment, upon powering up of the HMD device and HMD computer stick in an embodiment, the HMD device may initiate a pairing process using, for example, wireless communications described herein in order to communicatively couple to the HMD device to the information handling system. In an embodiment, this communication may further include any system or services information updates that may update software on the HMD device, for example.

The method 800 may also include, at block 810, with determining whether the registering fingerprint reader of the HMD compute stick or a fingerprint reader on a joystick of the XR handheld controller detects a fingerprint of a user. The registering fingerprint reader or other fingerprint reader may be used to initially register a user's fingerprint in the data storage device in various embodiments. As described herein, the user's detected fingerprint detected by the fingerprint reader on the multimodal joystick or the compute stick may also be used to log the user into the HMD device and allow the user to operate the HMD device. In one embodiment, in order to initially register the user's fingerprint, the user may place the user's thumb on the registering fingerprint reader in order to initially store the digital image of the user's fingerprint or biometric template of the user's fingerprint in the data storage device and associate the user's identification with that fingerprint. This identification data may include a name, a birthdate, an address, a phone number, or an email address, among other identification data. Settings for a user may be stored and associated with a user's profile and the fingerprint. The user may also be prompted, as a new user, to input a password or passcode and a username associated with the detected fingerprint and identification data. It is appreciated that, at block 810, the user may not need to register the user's fingerprint and may continue to block 825. However, where the user is a new user, the registration process may be conducted at block 815 with scanning the user's fingerprint. In the embodiments described herein, the fingerprint may be a fingerprint of the user's thumb as that finger will be in contact with the fingerprint reader when the user uses the XR handheld controller. However, it is appreciated that any fingerprint may be detected as the multimodal joystick may be placed on the XR handheld controller at any location where a user's finger may be contacting the XR handheld controller and a fingerprint reader thereon. A scan of side, the top or lower portion of the user's thumb may be conducted to detect plural contact inputs of the user's thumb from various sides or directions. This may be done to form a complete image of the user's thumbprint or a fingerprint of any other finger used to actuate the multimodal joystick described herein. This set of thumbprint or fingerprint images may be used to detect movement of a user's thumb via changes in fingerprint images detected by a fingerprint detector to assist in determining direction for fine motor movement directional inputs detected at the fingerprint detector in some embodiments. For example, a fingerprint image that changes to show more of the left side of a user's thumb may indicate a thumb slide from left to right across the fingerprint reader. Similarly, more of the right side of a user's thumb in a changed fingerprint image may detect a slide of a thumb from right to left. Similar principles may be applied to thumb slides up, down or in any direction across the fingerprint reader and detected by changes detected in a fingerprint image according to embodiments herein.

When the user's fingerprint is scanned at block 815, the method 800 may continue at block 820 with registering the user's fingerprint with the user's identity and storing that identity and fingerprint data on a data storage device. Again, this identification data may include a name, a birthdate, an address, a phone number, or an email address, among other identification data. The user may also be prompted, as a new user, to input a password or passcode and a username associated with the detected fingerprint and identification data.

At this point the method 800 may continue to block 825 with determining whether the fingerprint reader of the multimodal joystick on the XR handheld controller detects a fingerprint of the user. Similar to the registering fingerprint reader on the HMD compute stick, the fingerprint reader of the multimodal joystick on the XR handheld controller may capture an image of the user's fingerprint using, for example, a digital camera. A log-in detection of a user's finger may also be detected on the registering fingerprint reader on the compute stick in some embodiments. Where no fingerprint is detected, the method 800 may end.

Where a fingerprint is detected at block 825, the method 800 continues to block 830 where the fingerprint data or login credentials may be transmitted from the XR handheld controller to an information handling system or HMD device for accessing the data storage device maintaining the users' fingerprint data and associated user identifications to cross-reference the detected fingerprint of the user with the user's identification in an embodiment. The data storage device may be located at any location where a processing device of the XR handheld controller or HMD device may access this data. The data storage device may be located on the HMD compute stick, the XR handheld controller, the HMD device, a local information handling system, or a remote information handling system in various embodiments.

The method 800 may proceed with determining, at block 835, if the user's fingerprint is registered. Here, the processing device may determine whether the detected user's fingerprint at block 825 is present on the data storage device. Where the user's fingerprint is not registered, the method 800 may continue with prompting the user to register the user's fingerprint at the registering fingerprint reader of the HMD computer stick at 840 or, in some embodiments, on the XR handheld controller. This prompt may be presented to a user at the HMD display device of the HMD device or at a video display device of the information handling system herein. At this point the method 800 proceeds to block 810 for the user to register the user's fingerprint as described in various embodiments.

Where the user's fingerprint is registered at block 835, the method 800 proceeds to block 845 with logging the user into the HMD device. As described herein, the fingerprint scan of the user by the fingerprint reader on the multimodal joystick or on the compute stick may allow the user to be identified and logged into the HMD device so that the user may interact with the HMD device and the XR environment presented to the user. In various embodiments, the fingerprint data or login credentials may be transmitted from the XR handheld controller to an information handling system or HMD device for coordination of the login of a user. Upon detection of a fingerprint by the fingerprint reader, in an embodiment, may cause the log in process to be conducted seamlessly and automatically thereby providing a user-defined XR environment to the user. Settings on the XR handheld controller, the HMD device may be initiated automatically upon login in accordance with the user's profile.

When the user is logged into the HMD device at block 845, the user may begin to interact with an XR environment including, in an example embodiment, a first-person shooter gaming application being executed at the HMD device. During interaction with the XR environment the user may provide input using the XR handheld controller described herein. during this use of the XR handheld controller a microcontroller of the XR handheld controller or other processing device may determine, at block 850 whether the user's fingerprint is detected with the fingerprint reader. As described herein, the detection or non-detection of the user's fingerprint (e.g., the user's thumb) may indicate the type of input being provided by the user via the XR handheld controller.

Where no fingerprint is detected at the fingerprint reader at block 850, the microcontroller may detect push-button input when the fingerprint reader does not detect the user's fingerprint and the user presses a side of the multimodal joystick with the multimodal joystick. In an embodiment, when the fingerprint reader does not detect the user's fingerprint at block 850 but does detect that the multimodal joystick has been tilted, the input may change to a push-button input. The mode change may be executed at the XR handheld controller, at the HMD device, a coupled information handling system or some combination in various embodiments. Thus, the multimodal joystick tilt data and no data indicating presence of a fingerprint (or data indicating an absence of a fingerprint) is transmitted from the XR handheld controller to an information handling system or HMD device for use as push-button input in an XR environment in one embodiment. In another embodiment, the XR handheld controller transmits the push-button input data, already determined from the XR handheld controller to an information handling system or HMD device for use in the XR environment.

For example, where the user's fingerprint is not being detected by the fingerprint reader and the multimodal joystick has been tilted to the right, this input may represent a push button of, for example, an "A" button of a gaming console, for example. In this embodiment, the multimodal joystick not only acts as a directional input device as described herein but also acts as a push-button input device depending on the detection, or not, of the user's fingerprint at the fingerprint reader. In another example embodiment, where the user's fingerprint is not detected at the fingerprint reader and the multimodal joystick is tilted to the left, this input may represent a push button of, for example, a "B" button on a gaming console, for example. With this second mode (e.g., a push-button input) of input being possible at the multimodal joystick the multimodal joystick may reduce the number of individual input buttons, triggers, and joysticks formed into the XR handheld controller. This may reduce the complexity of the XR handheld controller to the user, reduce space necessary for the user to interact with all the input methods, and reduce the number of parts that may fail during use. Still further, with the multimodal joystick, the user may have a single location where input can be provided to interact within the XR environment reducing the finger movement necessary to do so. Additionally, the use of the multimodal joystick with its fingerprint reader allows a user to differentiate between fine motor movements and gross motor movements within the XR environment. This push-button type of input from the XR handheld controller by the user may be continually monitored while, at block 875, the microcontroller determines whether the HMD device has been turned off. Where the HMD device has not been turned off at block 875, the method 800 may return to block 850 with the determination as to whether the user's fingerprint is detected at the fingerprint reader. Where it is determined that the HMD device has been turned off at block 875, the method 800 may end.

At block 850, where it is determined that the user's fingerprint has been detected at the fingerprint reader, the method 800 may continue to block 860 with determining whether a tilt or movement of the multimodal joystick has been detected. As described herein, the detection, or not, of tilt or movement of the multimodal joystick may determine whether gross motor movement directional inputs or fine motor movement directional inputs are detected at the multimodal joystick of the XR handheld controller. Where tilt or movement is detected at block 860, the method 800 continues to block 865 with a microcontroller at the multimodal joystick detecting gross motor movements.

In an embodiment, the directional tilting of the multimodal joystick (e.g., detected at block 860 while the user's fingerprint is detected at block 850 may be defined as gross motor movement directional input. To detect this gross motor movement directional input, a processing resource (e.g., the HMD processor or microcontroller of the XR handheld controller) of the HMD device may execute a gross motor movement detector system that detects the tilting of the multimodal joystick in a direction and register that tilt as a gross motor movement. Thus, the multimodal joystick tilt data and data indicating presence of a fingerprint is transmitted from the XR handheld controller to an information handling system or HMD device for use as gross motor movement directional input in an XR environment in one embodiment. In another embodiment, the XR handheld controller transmits the gross motor movement directional input data, already determined from the XR handheld controller to an information handling system or HMD device for use in the XR environment.

This gross motor movement may be replicated in the XR environment by causing, for example, the user or an avatar of the user to look or move within the XR environment in a rapid motion. In the example where a user is engaged in a gaming application at the HMD device, the gross motor movement detected by the execution of the gross motor movement detector system may move at a relatively quick speed. In an example embodiment, the more the user tilts the multimodal joystick, the quicker the user or avatar representing the user looks or moves within the XR environment. In an embodiment, the user may be presented with or be able to access settings that allow the user to adjust the gross movement when tilting the multimodal joystick. These settings may be presented to a user via a graphical user interface (GUI) with the HMD device or at a video display device of the information handling system.

In an embodiment, the inward movement (e.g., at block 860) of the multimodal joystick with the detection of the user's fingerprint on the fingerprint reader at block 850 provides a separate type of input. In an embodiment, the multimodal joystick may be pressed down and into the housing of the XR handheld controller. This actuation of the multimodal joystick may be different from other push-button actuations of the multimodal joystick because the user's fingerprint is detected at the fingerprint reader and the actuation is not along a perimeter of the multimodal joystick and instead is directly down on the multimodal joystick. This center push-button input may serve as an additional input method. Thus, the multimodal joystick push-button data and data indicating presence of a fingerprint is transmitted from the XR handheld controller to an information handling system or HMD device for use as center push-button input in an XR environment in one embodiment. In another embodiment, the XR handheld controller transmits the center push-button input data, already determined from the XR handheld controller to an information handling system or HMD device for use in the XR environment.

Where the user's fingerprint is detected at block 850 and the microcontroller of the XR handheld controller detects that no tilt or movement of the multimodal joystick has been detected at block 860, the method 800 includes monitoring changes in fingerprint images for fine motor movements with the fingerprint reader at block 870 with the multimodal joystick. In an embodiment, the fingerprint reader may detect travel of the user's thumb across the fingerprint reader by detecting changes, in real-time, in the images of the user's fingerprint. As described herein, the user had provided the user's fingerprint for imaging of the entire fingerprint used to operate the multimodal joystick. The HMD CPU/GPU/XR processor, microcontroller of the XR handheld controller, or HMD processor on the compute stick of the HMD device may execute the fine motor movement detector system to detect these changes in the fingerprint detected as the user moves the user's thumb across the fingerprint reader where the changes indicate a direction of fine motor movement based on what portion of a user's fingerprint appears in the changed fingerprint image. Thus, no multimodal joystick tilt data (or data indicating an absence of a multimodal joystick tilt) and data indicating presence of a fingerprint or changes in the fingerprint image are transmitted from the XR handheld controller to an information handling system or HMD device for use as fine motor movement directional input in an XR environment in one embodiment. In another embodiment, the XR handheld controller transmits the fine motor movement directional input data, already determined from the XR handheld controller to an information handling system or HMD device for use in the XR environment.

As the HMD CPU/GPU/XR processor or other processing resource detects this fine motor movement, the user or an avatar of the user presented within the XR environment may look or move in fine movements. In the example embodiment where the gaming application is a first-person shooter gaming application being executed at the HMD device, the user may use the fine motor movement to, for example, finely move the user's gun so as to be accurately on target. In such an embodiment, the multimodal joystick may not be tilted or moved, only thumb movement on the fingerprint reader is detected for fine motor movement in an XR environment.

The method 800 may then proceed to a determination whether the HMD device has been turned off at block 875. Where the HMD device has not been turned off, the method 800 continues to execute those processes described in connection with blocks 850, 855, 860, 865, and 870. Where it has been determined that the HMD device has been turned off at block 875, the method 800 may end.

The blocks of the flow diagrams of FIG. 8 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An extended reality (XR) handheld controller to operate with a head-mounted display (HMD) device and information handling system comprising:
   the HMD device having an HMD processor, a data storage device, and an HMD display device to present to a user an extended reality image of an environment; and
   the extended reality (XR) handheld controller including:
   a handheld controller microcontroller;
   a handle portion;
   a multimodal joystick; and
   a fingerprint reader formed into the multimodal joystick, wherein the multimodal joystick provides directional input when the fingerprint reader detects a user's fingerprint and the user tilts the multimodal joystick in a direction, and wherein the multimodal joystick provides push-button input when the fingerprint reader does not detect the user's fingerprint and the user presses a side of the multimodal joystick.

2. The XR handheld controller of claim 1 further comprising:
   the HMD processor or the handheld controller microcontroller executing code instructions of a gross motor movement detector system to detect gross motor movement directional input when the user tilts the multimodal joystick with the user's fingerprint on the fingerprint reader.

3. The XR handheld controller of claim 1 further comprising:
   the fingerprint reader to detect image changes of the user's fingerprint to indicate movement of the user's finger across the fingerprint reader; and
   the HMD processor or the handheld controller microcontroller executing code instructions of a fine motor movement detector to detect fine motor movement directional input when movement of the user's finger across the fingerprint reader is detected and the multimodal joystick is detected as not being tilted.

4. The XR handheld controller of claim 1, wherein:
   the push-button input includes a first actuation input when the user pushes on a left side of the multimodal joystick; and
   the push-button input includes a second actuation input when the user pushes on a right side of the multimodal joystick.

5. The XR handheld controller of claim 1 wherein a center push-button input is received when the user presses down on a center portion of the multimodal joystick and the fingerprint reader detects the user's fingerprint.

6. The XR handheld controller of claim 1 further comprising:
the HMD device including an HMD compute stick, wherein the HMD compute stick houses the HMD processor and data storage device and further includes an HMD battery to supply power to the HMD device; and
a registering fingerprint reader to register the user's fingerprint and associate the user's fingerprint and an identity of the user in the data storage device, wherein the user's fingerprint and identity are used as login data for the user to interact with the HMD device via the XR handheld controller.

7. The XR handheld controller of claim 6, wherein:
the fingerprint reader of the XR handheld controller to detect the user's fingerprint;
the HMD processor or the handheld controller microcontroller executing code instructions to cross-reference the user's fingerprint with the user's identity in the data storage device, and login the user to the HMD device allowing the user to interact with the HMD device.

8. The XR handheld controller of claim 1, further comprising:
the XR handheld controller further comprising a handheld controller wireless radio to operatively couple the XR handheld controller to the to the information handling system and HMD device.

9. A head-mounted display (HMD) device to operate with an extended reality (XR) handheld controller comprising:
the HMD device including:
an HMD display device to present to a user an extended reality image of an environment;
an HMD wireless radio to wirelessly interface with the extended reality (XR) handheld controller including a multimodal joystick and a fingerprint reader formed into the multimodal joystick, wherein the HMD wireless radio receives directional input from the multimodal joystick when the fingerprint reader detects a user's fingerprint, and wherein the wireless radio receives push-button input from the multimodal joystick when the fingerprint reader does not detect the user's fingerprint; and
an HMD compute stick operatively coupled to the HMD device, the HMD compute stick housing an HMD processor and data storage device and, an HMD battery to supply power to the HMD device.

10. The HMD device of claim 9 further comprising:
the HMD compute stick including a registering fingerprint reader to register the user's fingerprint and associate the user's fingerprint and an identity of the user in the data storage device, wherein the user's fingerprint and identity are used as login data for the user to interact with the HMD device.

11. The HMD device of claim 10 further comprising:
the HMD wireless radio to receive data indicating the user's fingerprint is detected at the fingerprint reader of the XR handheld controller;
the HMD processor to cross-reference the user's fingerprint with the user's identity in the data storage device, and
the HMD processor to login the user to the HMD device allowing the user to interact with the HMD device.

12. The HMD device of claim 9 further comprising:
the HMD wireless radio to receive tilt data and fingerprint detection data of the user from the XR handheld controller as the directional input; and the HMD processor to execute a gross motor movement detector system to detect gross motor movement directional input when the user tilts the multimodal joystick the user's fingerprint is detected on the fingerprint reader.

13. The HMD device of claim 9 further comprising:
the HMD wireless radio to receive gross motor movement directional input as the directional input from the XR handheld controller based on detection of multimodal joystick tilt and fingerprint detection of the user by a gross motor movement detector system when the user tilts the multimodal joystick and the user's fingerprint is on the fingerprint reader.

14. The HMD device of claim 9 further comprising:
the HMD wireless radio to receive no tilt data and fingerprint detection images indicating thumb movement across the fingerprint reader as the directional input from the XR handheld controller; and
the HMD processor to execute a fine motor movement detector system to detect fine motor movement directional input when the user moves the user's fingerprint across the fingerprint reader and the multimodal joystick is not tilted.

15. The HMD device of claim 9 further comprising:
the HMD wireless radio to receive fine motor movement directional input as the directional input from the XR handheld controller based on no detection of multimodal joystick tilt and a fingerprint detection of the user including fingerprint detection images indicating thumb movement across the fingerprint reader by a fine motor movement detector system when the user does not tilt the multimodal joystick and the user's fingerprint moves across the fingerprint reader.

16. The HMD device of claim 9 further comprising:
an HMD wireless radio to receive center push-button input data from the multimodal joystick on the XR handheld controller, wherein the center push-button input is received when the user presses down on a center portion of the multimodal joystick and the fingerprint reader detects the user's fingerprint.

17. A method of receiving input from an extended reality (XR) handheld controller operatively coupled to a head-mounted display (HMD) device comprising:
with a fingerprint reader of the XR handheld controller operatively coupled to the HMD device:
detecting a fingerprint of a user;
transmitting that fingerprint to register with an identity of the user in a data storage for logging into the HMD device;
receiving at a multimodal joystick, gross motor movement directional input when the fingerprint reader detects the user's fingerprint and the user tilts the multimodal joystick in a direction;
receiving at the multimodal joystick push-button input when the fingerprint reader does not detect the user's fingerprint and the user presses a side of the multimodal joystick;
receiving at the multimodal joystick fine motor movement directional input when the fingerprint reader detects the user's fingerprint, detects changes in the fingerprint image indicating movement of a user's finger across the fingerprint reader, and detects no tilt of the multimodal joystick; and
transmitting the gross motor movement directional input, the fine motor movement direction input, and the push-button input to the HMD device depending on the mode of input.

18. The method of claim 16 further comprising:
wirelessly coupling the XR handheld controller with the HMD device via a Bluetooth wireless link.

19. The method of claim 16 further comprising:
processing gross motor, fine motor, and push-button inputs at the HMD devices to interact with an XR environment presented at the HMD device.

20. The method of claim 16, wherein the push-button input includes a first actuation input when the user pushes on a left side of the multimodal joystick, and the push-button input includes a second actuation input when the user pushes on a right side of the multimodal joystick.

* * * * *